(12) United States Patent
Park et al.

(10) Patent No.: US 9,841,858 B2
(45) Date of Patent: Dec. 12, 2017

(54) TOUCH WINDOW

(71) Applicant: LG INNOTEK CO., LTD., Seoul (KR)

(72) Inventors: Soung Kyu Park, Seoul (KR); Chung Wan Lee, Seoul (KR); Do Youb Kwon, Seoul (KR); Ji Chang Ryu, Seoul (KR); Taek Hoon Nam, Seoul (KR); Jin Seok Lee, Seoul (KR); Jae Hak Her, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 86 days.

(21) Appl. No.: 14/793,415

(22) Filed: Jul. 7, 2015

(65) Prior Publication Data

US 2016/0004353 A1 Jan. 7, 2016

(30) Foreign Application Priority Data

Jul. 7, 2014 (KR) .................. 10-2014-0084773
Jul. 21, 2014 (KR) .................. 10-2014-0091755

(51) Int. Cl.
*G06F 3/044* (2006.01)

(52) U.S. Cl.
CPC .... *G06F 3/044* (2013.01); *G06F 2203/04102* (2013.01)

(58) Field of Classification Search
CPC ........ G06F 3/044; G06F 3/045; G06F 3/0412; G06F 2203/04111; G09G 3/3648; H05K 3/40; H05K 31/0213
See application file for complete search history.

(56) References Cited

U.S. PATENT DOCUMENTS

| 2005/0046622 | A1* | 3/2005 | Nakanishi | G06F 3/045 345/173 |
| 2011/0139516 | A1* | 6/2011 | Nirmal | G06F 3/044 178/18.01 |
| 2012/0127414 | A1* | 5/2012 | Shin | G06F 3/0412 349/139 |
| 2014/0131069 | A1* | 5/2014 | Chang | H05K 3/40 174/251 |

* cited by examiner

*Primary Examiner* — Benjamin C Lee
*Assistant Examiner* — Robert Michaud
(74) *Attorney, Agent, or Firm* — KED & Associates, LLP

(57) ABSTRACT

A touch window includes a substrate comprising a first area and a second area, a wire electrode on the second area, an intermediate layer provided on the substrate to cover an end of the wire electrode, a sensing electrode on the intermediate layer, and a connection electrode to connect the sensing electrode with the wire electrode. The connection electrode is provided on the intermediate layer to connect the sensing electrode with the wire electrode.

17 Claims, 21 Drawing Sheets

TOUCH WINDOW

CROSS-REFERENCE TO RELATED APPLICATION(S)

This application claims priority under 35 U.S.C. §119 to Korean Application No. 10-2014-0084773 filed on Jul. 7, 2014 and Korean Application No. 10-2014-0091755 filed on Jul. 21, 2014, whose entire disclosures are hereby incorporated by reference.

BACKGROUND

1. Field

The embodiment relates to a touch window.

2. Background

Recently, a touch window, which performs an input function through the touch of an image displayed on a display device by a finger or an input device, such as a stylus pen, has been applied to various electronic appliances. The touch window includes a substrate provided thereon with a sensing electrode and a wire electrode connected with the wire electrode, and senses the variation in capacitance to detect a touch position when an area, in which the sensing electrode is provided, is touched. Various types of touch windows may be configured according to position relations of the sensing electrode and/or the wire electrode.

Researches and studies have been performed on providing an intermediate layer serving as a dielectric layer on the substrate and directly forming an electrode on the dielectric layer in order to reduce the thickness of the touch window. When the sensing electrode provided on the dielectric layer is connected with the wire electrode provided on the substrate, the adhesive strengths of connection electrodes may be degraded due to the step difference between the dielectric layer and the substrate, and the bonding areas of the connection electrodes are increased, so that a display area may be reduced.

BRIEF DESCRIPTION OF THE DRAWINGS

The embodiments will be described in detail with reference to the following drawings in which like reference numerals refer to like elements wherein.

DETAILED DESCRIPTION OF THE INVENTION

Figure 1:
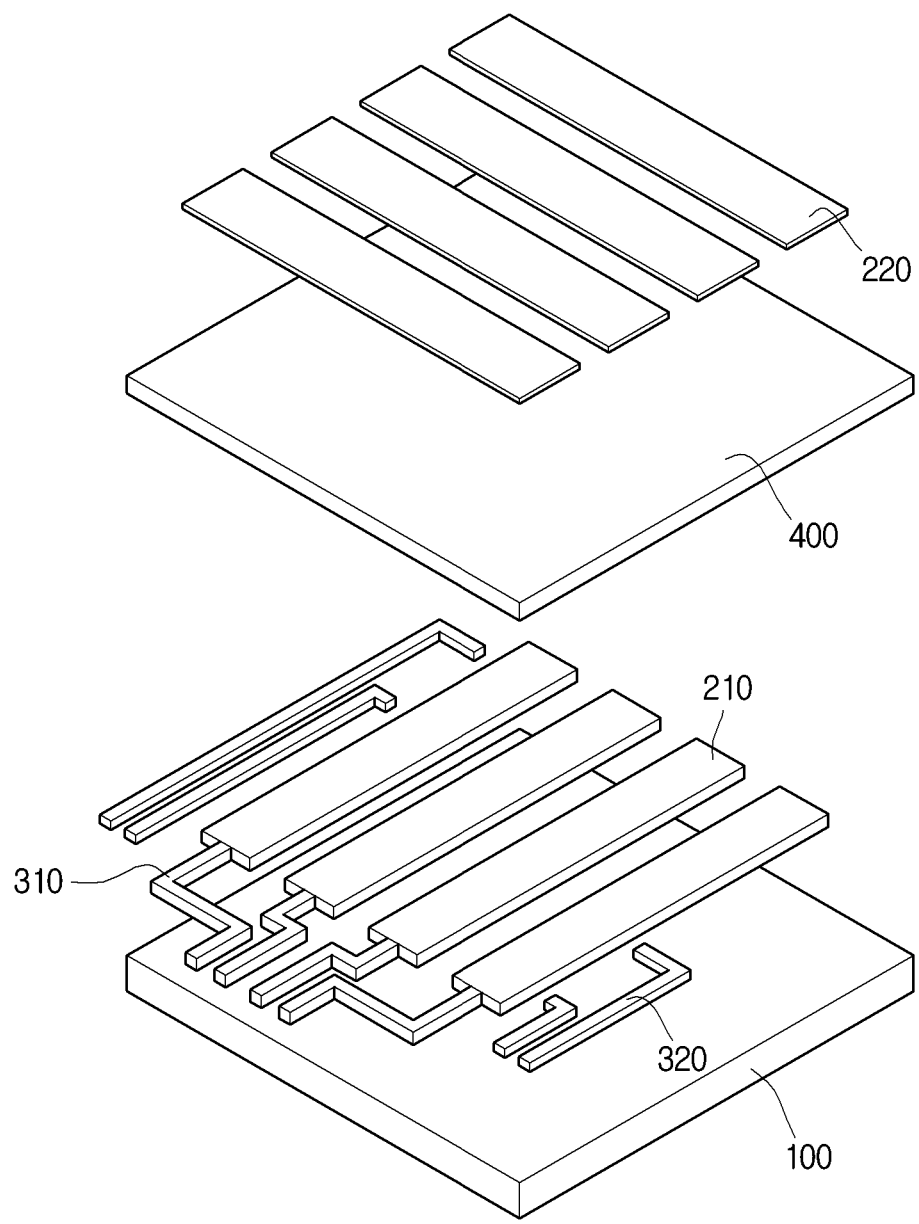
FIG. 1 is an exploded perspective view showing a touch window according to the embodiment.

Referring to FIGS. 1 to 10, a touch window according to a first embodiment may include a substrate 100, a sensing electrode 200, a wire electrode 300, an intermediate layer 400, and a connection electrode 500. The substrate may support the sensing electrode 200, the wire electrode 300, the intermediate layer 400, and the connection electrode 500. In other words, the substrate 100 may be a support substrate. The substrate 100 may be rigid or flexible.

For example, the substrate 100 may include a glass substrate or a plastic substrate. In detail, the substrate 100 may include chemically tempered/semi-tempered glass, such as soda lime glass or aluminosilicate glass, reinforced/flexible plastic, such as polyimide (PI), polyethylene terephthalate (PET), propylene glycol (PPG), or poly carbonate (PC), or sapphire.

In addition, the substrate 100 may include an optically isotropic film. For example, the substrate 100 may include cyclic olefin copolymer (COO), cyclic olefin polymer (COP), optically isotropic polycarbonate (PC), or optically isotropic polymethyl methacrylate (PMMA).

The sapphire has superior electric characteristics, such as permittivity, so that a touch response speed may be greatly increased and a space touch such as hovering may be easily implemented. In addition, since the sapphire has high surface hardness, the sapphire is applicable to a cover substrate. The hovering refers to a technique of recognizing coordinates even at a short distance from a display.

The substrate 100 may include a flexible substrate having a flexible characteristic. The substrate 100 may be bent to have a partial curved surface. That is, the substrate 100 may be bent to have a partial flat surface and a partial curved surface. In detail, an end of the substrate 100 may be bent to have a curved surface or may be bent or flexed to have a surface including a random curvature.

In addition, the substrate 100 may be a curved substrate or a bended substrate. In other words, even the touch window including the substrate may be formed to have a flexible, curved, or bended characteristic. Accordingly, the touch window according to the embodiment may be easily carried, and may be variously designed.

The substrate 100 may include a cover substrate. An additional cover substrate may be further provided on the substrate 100. The substrate may be bonded to the cover substrate through an adhesive layer. Accordingly, the cover substrate may be separately formed from the substrate, which makes an advantage in mass-production of the touch window.

The substrate 100 may have an active area AA and an unactive area UA defined therein. An image may be displayed in the active area AA. The image is not displayed in the unactive area UA provided at a peripheral portion of the active area AA.

In addition, the position of an input via finger or stylus pen may be sensed in at least one of the active area AA and the unactive area UA. If the finger or the input device, touches the touch window, the variation of capacitance occurs in the touched part, and the touched part subject to the variation of the capacitance may be detected as a touch point.

The sensing electrode 200 may include a first sensing electrode 210 and a second sensing electrode 220. The first sensing electrode 210 and the second sensing electrode 220 extend in directions different from each other, and may be provided at mutually different positions.

The first sensing electrode 210 is provided on the substrate 100, an intermediate layer to entirely or partially cover the first sensing electrode 210 is formed, and the second sensing electrode 220 is provided on the intermediate layer, so that the adhesive layer between the first sensing electrode 210 and the second sensing electrode 220 can be removed. The thickness of the touch window can be reduced, and the process cost can be reduced.

The first sensing electrode 210 may be provided on the substrate 100. For example, the first sensing electrode 210 may be provided on at least one of the active area AA and the unactive area UA of the substrate 100. The first sensing electrode 210 may be likely provided on the active area AA of the substrate 100.

The second sensing electrode 220 may be provided on the intermediate layer 400. For example, the second sensing electrode 220 may be provided on the intermediate layer 400 corresponding to the active area AA and the non-active area UA. The second sensing electrode 220 may be likely provided on the intermediate layer 400 corresponding to the active area AA.

The first sensing electrode 210 and the second sensing electrode 220 may extend in directions different from each other. The first sensing electrode 210 may extend in the first direction, and the second sensing electrode 220 may extend in a direction different from the first direction. At least one of the first and second sensing electrodes 210 and 220 may include a transparent conductive material allowing the flow of electricity without the interruption of light transmission. The sensing electrode 200 may include a metallic oxide such as an indium tin oxide, an indium zinc oxide, a copper oxide, a tin oxide, a zinc oxide, or a titanium oxide. Since the transparent material is provided on the active area for the sensing, the degree of freedom can be improved when the pattern of the sensing electrode is formed.

In addition, at least one of the first sensing electrode 210 and the second sensing electrode 220 may include a nanowire, a photosensitive nanowire film, a carbon nanotube (CNT), graphene, conductive polymer or the mixture thereof. Accordingly, when the flexible and/or bent touch window is realized, the degree of freedom can be improved.

When a nanocomposite, such as a nanowire or a carbon nanotube (CNT), is used, the touch window may be configured in black, and the content of nanopowders may be controlled to ensure electrical conductivity while controlling color and reflectance.

In addition, at least one of the first and second sensing electrodes 210 and 220 may include various metals. For example, the sensing electrode 200 may include at least one of chromium (Cr), nickel (Ni), copper (Cu), aluminum (Al), silver (Ag), molybdenum (Mo), gold (Au), titanium (Ti), and the alloy thereof. Accordingly, when the touch window is realized with a flexible property and/or a bending property, the degree of the freedom can be improved.

For example, the first sensing electrode 210 provided on the substrate 100 may include at least one of the above-described metal, a transparent conductive material, a nanowire, a photosensitive nanowire film, a carbon nanotube (CNT), a grapheme, and conductive polymer. The second sensing electrode 220 provided on the intermediate layer 400 may include a nanowire or a photosensitive nanowire film.

In addition, at least one of the first and second sensing electrodes 310 and 320 may have a mesh shape. In detail, the sensing electrode may include a plurality of sub-electrodes, and the sub-electrodes cross each other while forming the mesh shape. The sensing electrode may have mesh lines formed by the sub-electrodes crossing each other in the mesh shape and a mesh opening part formed between the mesh lines.

In this case, a line width of the mesh line may be in the range of about 0.1 µm to about 10 µm. The mesh line having a line width of about 0.1 µm or less may not be formed due to the characteristic of a fabrication process, or may be shorted. If the line width excesses about 10 µm, the electrode pattern may be viewed from the outside, thereby deteriorating the visibility. The line width of the mesh line may be likely in the range of about 0.5 µm to about 7 µm. The line width of the mesh line may be more likely to be in the range of about 1 µm to about 3.5 µm.

The mesh opening may be formed in various shapes. For example, the mesh opening OA may have various shapes such as a polygonal shape including a rectangular shape, a diamond shape, a pentagonal shape or a hexagonal shape, or a circular shape. The mesh opening may be formed in a regular or random shape.

The sensing electrode 200 may have a mesh shape so that the pattern of the sensing electrode 200 may not be viewed on the active area AA, for example, a display area. Even if the sensing electrode is formed of metal, the sensing electrode may not be viewed. Even if the sensing electrode is applied to a large-size touch window, the resistance of the touch window may be also lowered. The sensing electrode and the wire electrode may be simultaneously patterned using the same material.

The wire electrode 300 may be provided on the substrate 100. The wire electrode 300 may be provided on at least one of the active area AA and the unactive area UA of the substrate 100. The wire electrode 300 may be likely provided on the unactive area UA of the substrate 100.

The wire electrode 300 may include a first wire electrode 310 and a second wire electrode 320. For example, the wire electrode 300 may include the first wire electrode 310 connected with the first sensing electrode 210 and the second wire electrode 320 connected with the second sensing electrode 220.

The first wire electrode 310 and the second wire electrode 320 are provided on the unactive area UA of the substrate 100, one end of the first wire electrode 310 and one end of the second wire electrode 320 are connected with the first sensing electrode 210 and the second sensing electrode 220, respectively, and opposite ends of the first and second sensing electrodes 210 and 220 may be connected with a circuit board. Various types of circuit boards may be employed. For example, the circuit board may include a flexible printed circuit board (FPCB).

The first and second wire electrodes 310 and 320 may include metal having excellent electrical conductivity. For example, the wire electrode 300 may include a material the same as or similar to that of the sensing electrode 200 described above. Accordingly, the sensing electrode and the wire electrode can be simultaneously patterned with the same material, so that the process efficiency can be improved.

The first and second wire electrodes 310 and 320 may make direct contact with one surface of the substrate 100. Accordingly, at least one of the first and second wire electrodes 310 and 320 may form a step difference from the intermediate layer 400 provided on the substrate 100.

At least one of the sensing electrodes and at least one of the wire electrodes may be connected with each other on the substrate 100. For example, the first sensing electrode 210, which is provided on the substrate 100, may be connected with the first wire electrode 310, which is provided on the substrate 100, on the substrate 100.

Alternatively, at least one of the sensing electrodes may be connected with at least one of the wire electrodes on the intermediate layer 400. For example, the second sensing electrode 220 provided on the intermediate layer 400 may be connected with the second wire electrode 320, which is provided on the substrate 100, on the intermediate layer 400. The connection of the second sensing electrode 210 with the second wire electrode 320 will be described below in detail.

The intermediate layer 400 may be provided on the substrate 100. In detail, the intermediate layer 400 may be provided on the first sensing electrode 210. In more detail, the intermediate layer 400 may be provided on the substrate 100 while covering the first sensing electrode 210.

A cover substrate may be further provided on the intermediate layer 400. For example, a cover substrate including glass or plastic may be further provided.

The intermediate layer 400 may partially cover the second wire electrode 320. The intermediate layer 400 may cover at least one of one end and an opposite end of the second wire electrode 320 provided on the substrate 100. At least one area of the substrate 100 may include an area in which the substrate 100, the second wire electrode 320, the intermediate layer 400, and the second sensing electrode 220 are sequentially laminated.

The intermediate layer 400 may include a material different from that of the substrate 100. For example, the intermediate layer 400 may include a dielectric material.

For example, the intermediate layer 400 may include an insulating group including halogen compound of alkali metal or alkali earth metal, such as LiF, KCl, $CaF_2$, or $MgF_2$, or fused silica, such as $SiO_2$, $SiN_x$, etc.; a semiconductor group including InP or InSb; transparent oxide used for semiconductor or dielectric substance including In compound, such as ITO or IZO, mainly used for a transparent electrode, or transparent oxide used for semiconductor or dielectric substance, such as $ZnO_x$, ZnS, ZnSe, $TiO_x$, $WO_x$, $MoO_x$, or $ReO_x$; an organic semiconductor group including $Alq_3$, NPB, TAPC, 2TNATA, CBP or Bphen; and a low-K material such as silsesquioxane or a derivative ((H—$SiO_{3/2}$)n) thereof, methylsilsesquioxane ($CH3$-$SiO_{3/2}$)n), porous silica or porous silica doped with fluorine or carbon atoms, porous zinc oxide ($ZnO_x$), cyclized-perfluoropolymer (CYTOP) or a mixture thereof.

The intermediate layer 400 may have about 75% to about 99% of visible ray transmittance. Accordingly, the visibility of the touch window according to the embodiment can be improved. The thickness of the intermediate layer 400 may be thinner than that of the substrate 100. In detail, the thickness of the intermediate layer 400 may be about 0.01 times to about 0.1 times thicker than the thickness of the substrate 100. For example, the substrate 100 may have the thickness of about 0.1 mm, and the intermediate layer 400 may have the thickness of about 0.001 mm. Accordingly, the whole thickness of the touch window according to the embodiment may be reduced, and the electrode provided on the intermediate layer 400 may be prevented from being cracked when the touch window is coupled to a display having a bending property or a curvature.

In addition, the sectional area of the intermediate layer 400 may be different from the sectional area of the substrate 100. In detail, the sectional area of the intermediate layer 400 may be smaller than that of the substrate 100. Accordingly, when the wire electrode is provided, the freedom degree of design can be increased.

The intermediate layer 400 may be directly provided on the top surface of the substrate 100. In other words, the intermediate layer 400 may be formed by directly coating a dielectric material on the top surface of the substrate 100 where the first sensing electrode 210 is provided. Thereafter, the second sensing electrode 220 may be provided on the intermediate layer 400.

The intermediate layer 400 may support the second sensing electrode 220. In detail, the second sensing electrode 220 may be provided on at least one of both surfaces of the intermediate layer 400. In other words, the first sensing electrode 210 may be interposed between the substrate 100 and the intermediate layer 400, and the second sensing electrode 220 may be provided on the intermediate layer 400 in the form of a protrusion. Accordingly, since an adhesive layer is not required between the first and second sensing electrodes, the whole thickness of the touch window can be reduced.

The second sensing electrode 220 provided on the intermediate layer 400 may be connected with the second wire electrode 320 provided on the substrate 100. The second wire electrode 320 may be divided into two areas by the intermediate layer 400. For example, the second wire electrode 320 provided on the substrate 100 may include a first area 1A covered with the intermediate layer 400 and a second area 2A that is not covered with the intermediate layer 400. In detail, the first area 1A of the second wire electrode 320 may be sandwiched between the substrate 100 and the intermediate layer 400. In addition, the second area 2A may not be covered with the intermediate layer 400, and may have the step difference from the intermediate layer 400 according to the thickness of the intermediate layer 400.

The width of the sensing electrode may be different from that of the wire electrode. In detail, the width of the second sensing electrode may be different from that of the second wire electrode. In addition, the width w2 of the first area 1A of the second wire electrode 320 may be different from the width w1 of the second sensing electrode 220. In detail, the width w2 of the first area 1A of the second wire electrode 320 may be greater than the width w1 of the second sensing electrode 220. Accordingly, the second wire electrode may be effectively connected with the second sensing electrode.

Further, the first width w2 of the first area 1A of the second wire electrode 320 may be the same as or different from the width w3 of the second area 2A. Although the second wire electrode 320 divided into the first area 1A and the second area 2A has been described with reference to FIG. 2 for the convenience of explanation, the first area 1A and the second area 2A of the second wire electrode 320 may be formed integrally with each other.

The second sensing electrode 220 and the second wire electrode 320 may be mutually connected with each other in the first area 1A. In detail, at least one through hole H may be formed through the intermediate layer 400 in the first area 1A. The first area 1A of the second wire electrode 320 may be exposed through the through hole H. In other words, the through hole H may be formed in an area corresponding to the first area 1A.

Accordingly, the second sensing electrode 220 may be connected with the second wire electrode 320 by the connection electrode 500 provided on the intermediate layer 400 to make contact with the first area 1A, which is exposed, and the second sensing electrode 220. The width of the connection electrode 500 may be different from that of the second wire electrode 320. In detail, the width of the connection electrode 500 may be narrower than that of the second wire electrode. Accordingly, the active area can be expanded.

The first area 1A may include an overlap area OA and a non-overlap area based on the relationship with the second sensing electrode. In other words, the first area 1A may include the overlap area OA, which is overlapped with the second sensing electrode 220, and the non-overlap area NOA, which is not overlapped with the second sensing electrode 220, defined due to the width difference between the first area 1A and the second sensing electrode 220.

The through hole H is formed through the intermediate layer 400. In addition, the through hole H may be formed in the non-overlap area (NOA), which is not overlapped with the second sensing electrode 220, in the first area 1A of the second wire electrode 320. In other words, the first area 1A of the second wire electrode 320 exposed through the through hole H may not be overlapped with the second sensing electrode 220.

The connection electrode 500 may make contact with the first area 1A exposed through the through hole H and the second sensing electrode 220. The connection electrode 500 may extend in a direction different from an extension direction of the second sensing electrode 220. In other words, the connection electrode 500 extends in the direction different from the extension direction of the second sensing electrode 220 while making contact with the first area 1A exposed through the through hole H and the second sensing electrode 220.

The connection electrode 500 may include a conductive material. For example, the connection electrode 500 may include a metallic material. In addition, the connection electrode 500 may include metallic paste. For example, the connection electrode 500 may include silver (Ag) paste.

Figure 2:
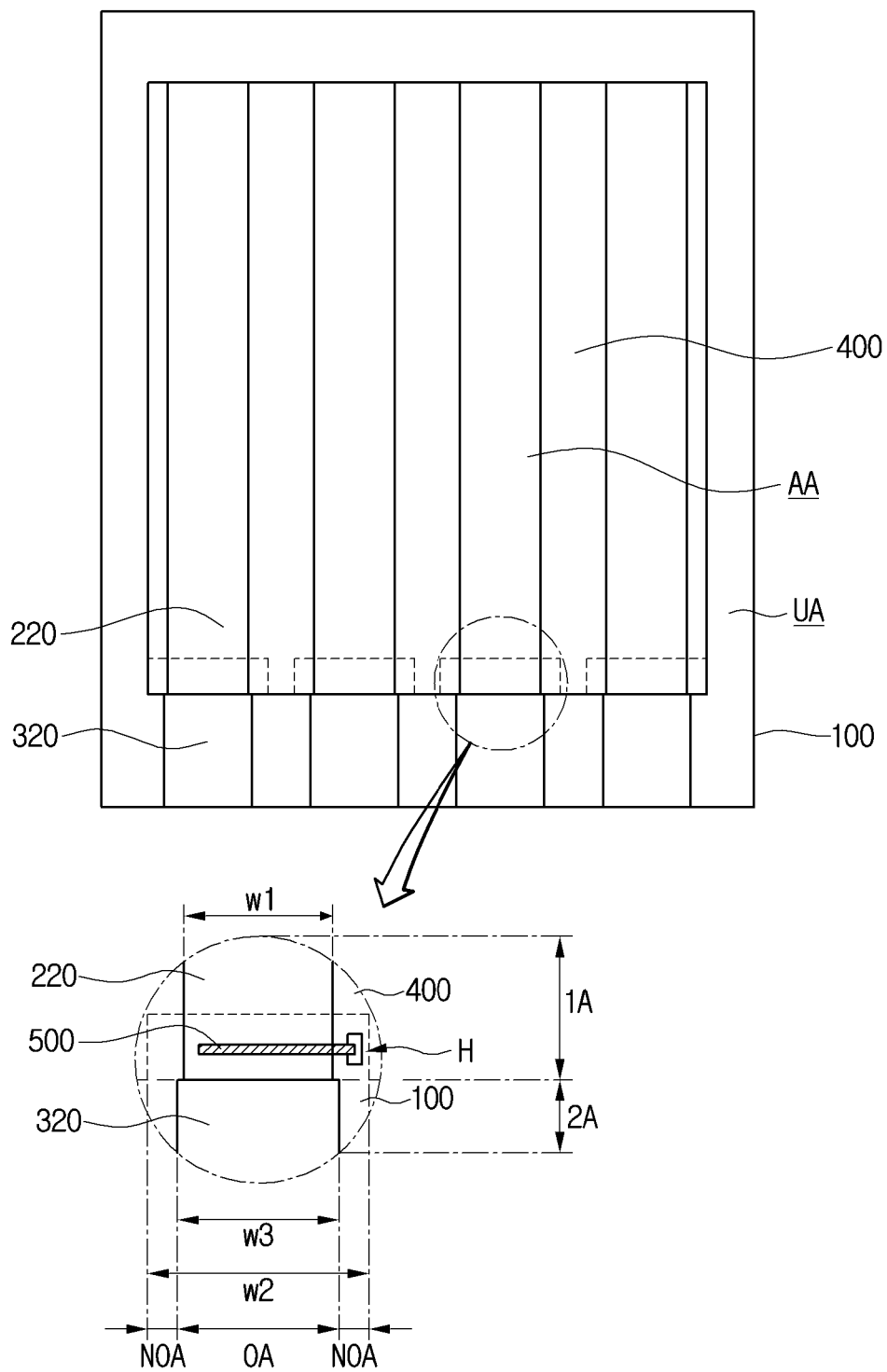
FIGS. 2 and 3 are plan views showing the touch window according to a first embodiment.

Although FIG. 2 shows one through hole, a plurality of through holes may be formed. Referring to FIGS. 3 to 6, the through hole H may include a first through hole H1 and a second through hole H2. In detail, the first through hole H1 may be formed in a first non-overlap area NOA1, which is not overlapped with the second sensing electrode 220, in the first area 1A of the second wire electrode 320, and the second through hole H2 may be formed in a second non-overlap area NOA2, which is not overlapped with the second sensing electrode 220, in the first area 1A of the second wire electrode 320. The first non-overlap area NOA1 may be separated from the second non-overlap area NOA2.

The connection electrode 500 may make contact with the first area 1A exposed through the through hole H and the second sensing electrode 220. The connection electrode 500 may extend in a direction different from an extension direction of the second sensing electrode 220. In other words, the connection electrode 500 extends in the direction different from the extension direction of the second sensing electrode 220 while making contact with at least one of the first area 1A exposed through the first through hole H1 and the first area 1A exposed through the second through hole H2, and the second sensing electrode 220.

In other words, the connection electrode 500 may be make contact with the first area 1A exposed through the first through hole H1 and the second sensing electrode 220, may make contact with the first area 1A exposed through the second through hole H2 and the second sensing electrode 220, or may make contact with the first area 1A exposed through the first through hole H1, the first area 1A exposed through the second through hole H2, and the second sensing electrode 220.

Figure 3:
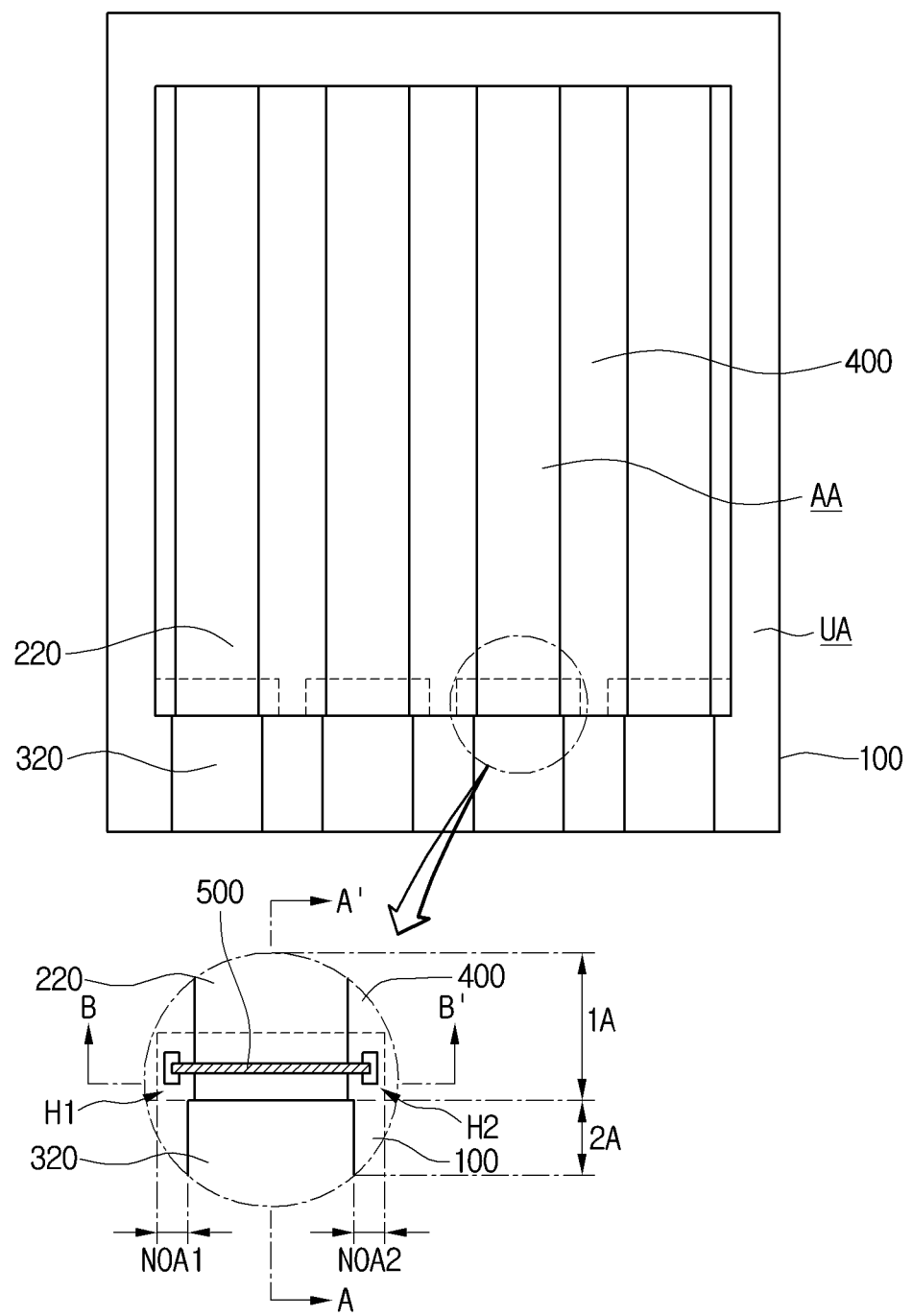
Figure 4:
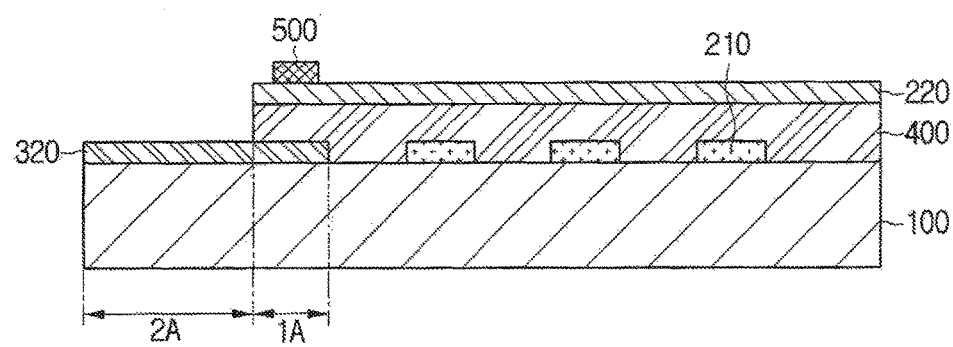
FIG. 4 is a sectional view taken along line A-A' of FIG. 3.
Figure 5:
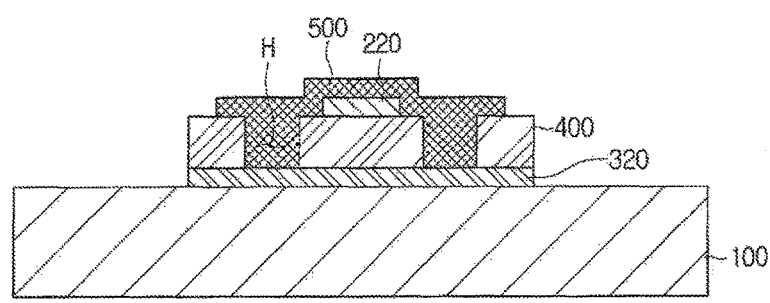
FIG. 5 is a sectional view taken along line B-B' of FIG. 3.

Referring to FIGS. 3 to 5, the connection electrode 500 makes contact with the first area 1A exposed through the first through hole H1, the first area 1A exposed through the second through hole H2, and the second sensing electrode 220, and the connection electrode 500 may be formed in the shape of the whole lump.

In other words, a portion of the connection electrode 500 to connect the first area 1A exposed through the first through hole H1 with the second sensing electrode 220 may be integrally formed with a portion of the connection electrode 500 to connect the first area 1A exposed through the second through hole H2 with the second sensing electrode 220. Accordingly, the contact areas between the connection electrode and the sensing electrode and between the connection electrode and the wire electrode are increased, so that the electrical characteristic can be improved.

Figure 6:
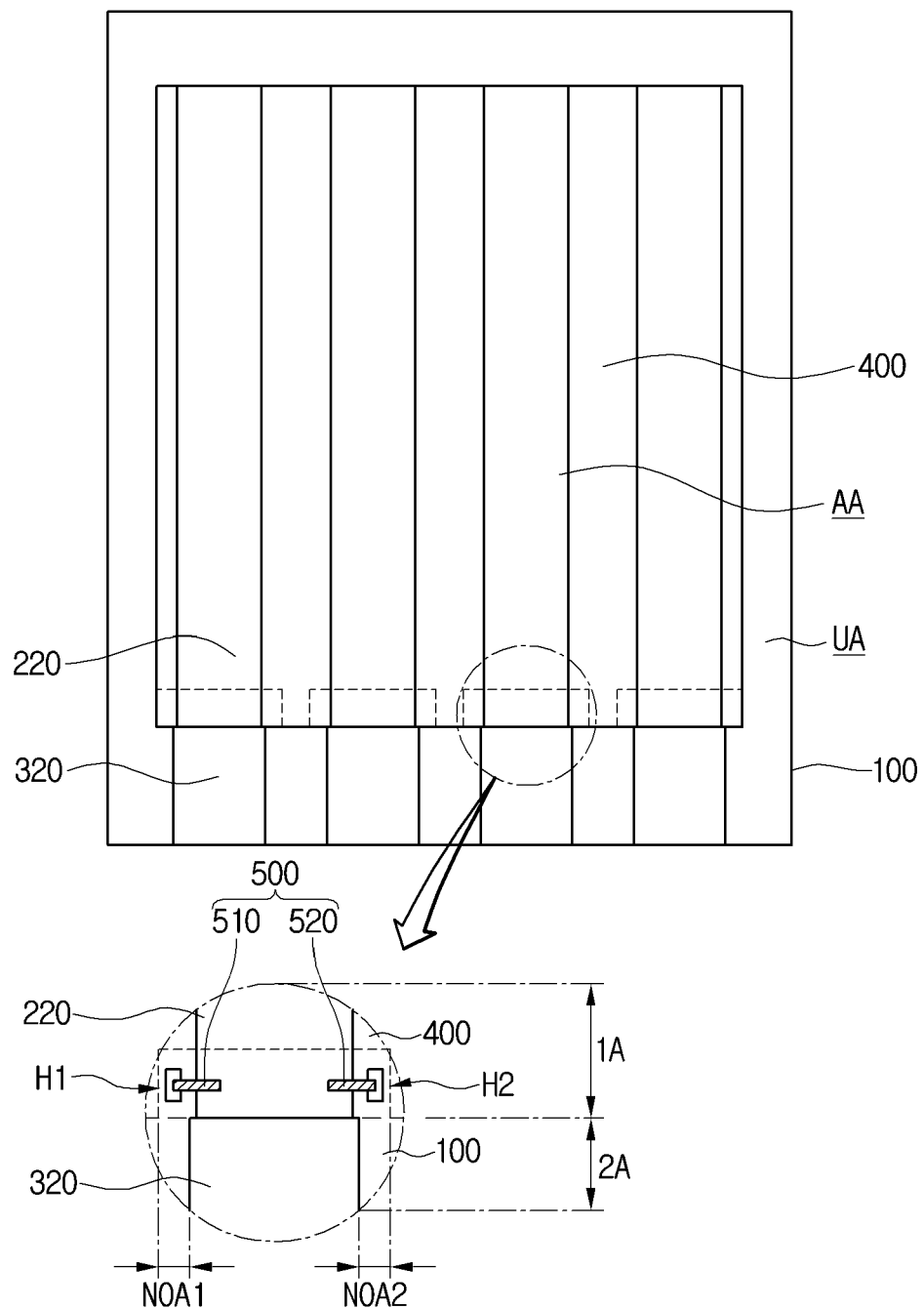
FIGS. 6 to 9 are plan views showing various touch windows according to the first embodiment.

In addition, referring to FIG. 6, the connection electrode may be separately formed while making contact with the first area 1A exposed through the first through hole H1, the first area 1A exposed through the second through hole H2, and the second sensing electrode 220. Accordingly, the length of the connection electrode can be reduced, so that the process cost can be reduced.

In detail, the connection electrode 500 may include a first connection electrode 510 and a second connection electrode 520. In other words, the connection electrode 500 may include the first connection electrode 510 to connect the first area 1A exposed through the first through hole H1 and the second sensing electrode 220, and the second connection electrode 520 to connect the first area 1A exposed through the second through hole H2 with the second sensing electrode 220. The first connection electrode 510 may be separated from the second connection electrode 520.

Figure 7:
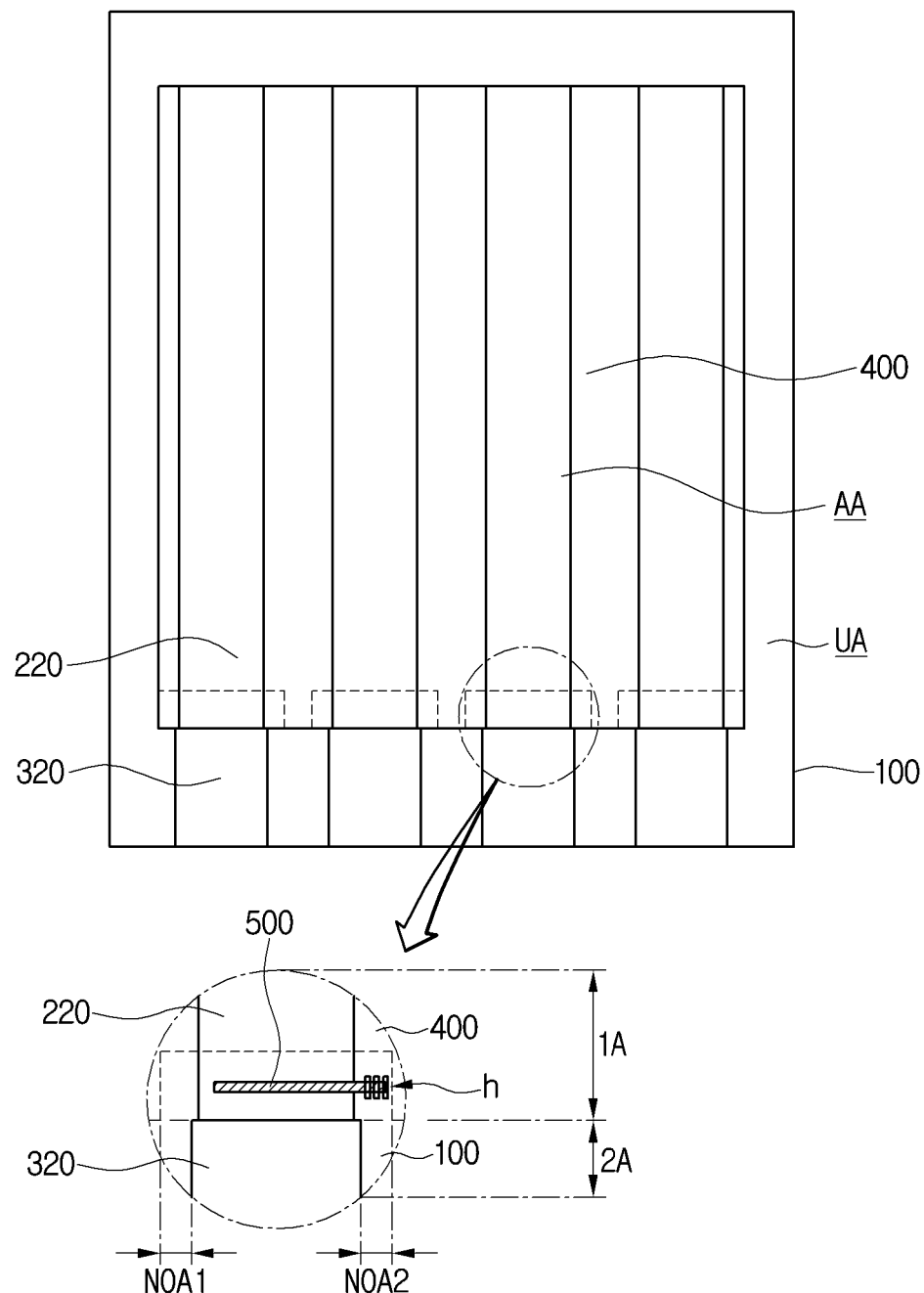
Figure 8:
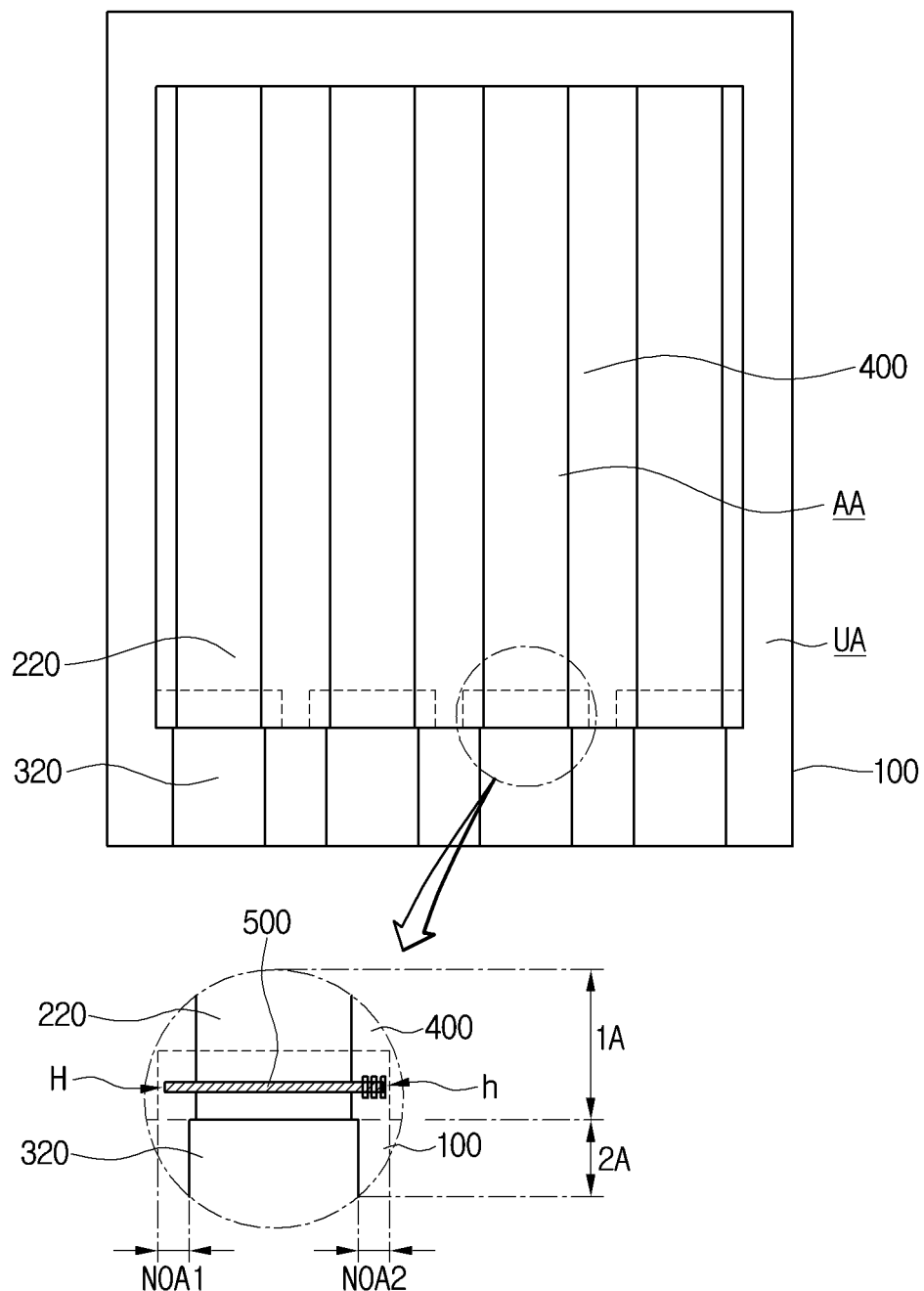
Figure 9:
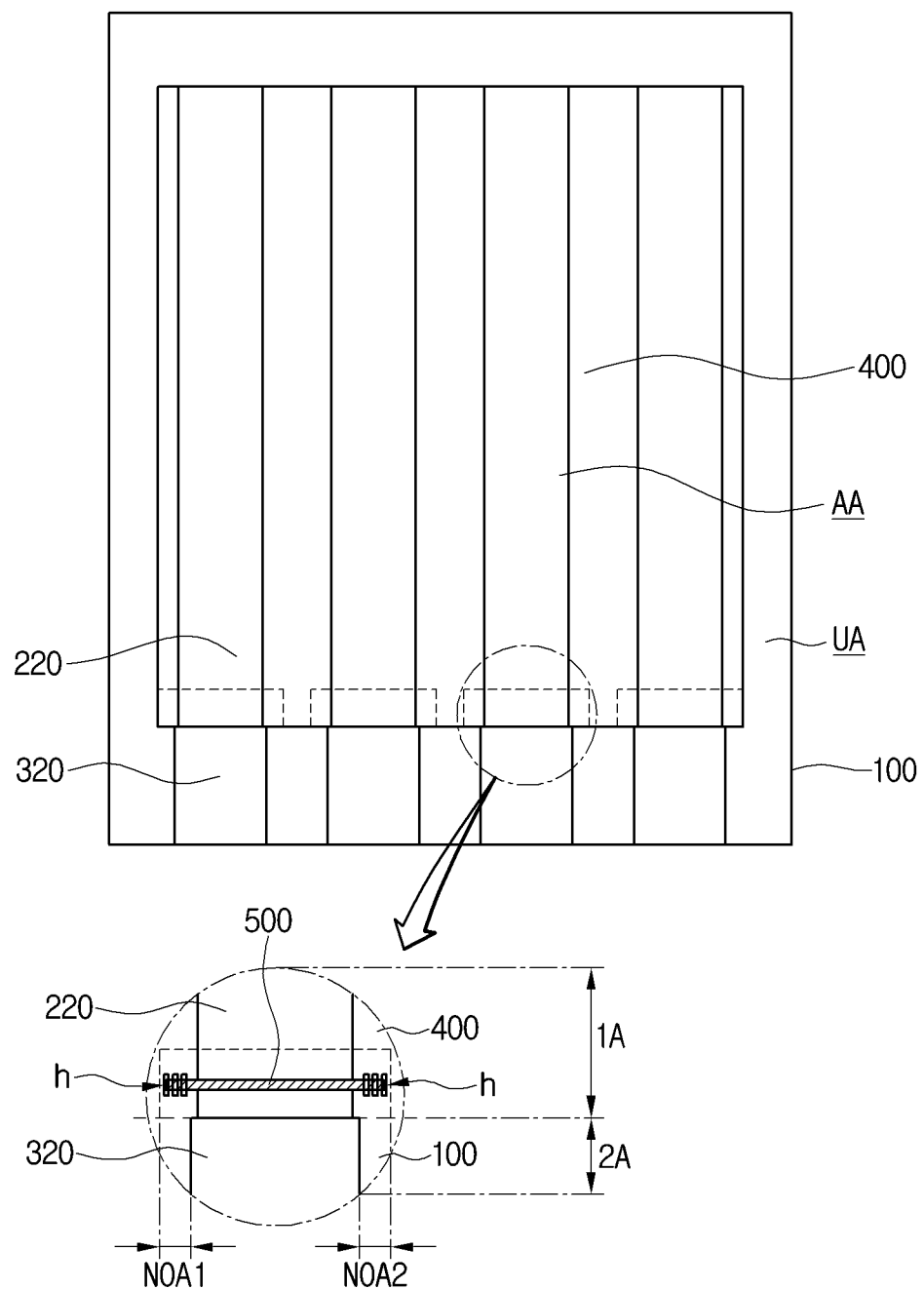

Although FIGS. 3 to 6 show two through holes, the embodiment is not limited thereto, but at least three through holes may be formed through the intermediate layer 500. Referring to FIGS. 7 to 9, a plurality of sub-through holes h may be formed through at least one of the first and second non-overlap areas NOA1 and NOA2.

In other words, as shown in FIG. 7, a plurality of sub-through holes h may be formed through only one of the first and second non-overlap areas NOA1 and NOA2. In addition, as shown in FIG. 8, a plurality of sub-through holes h may be formed through one of the first and second non-overlap areas NOA1 and NOA2, and one through hole may be formed in the other of the first and second non-overlap areas NOA1 and NOA2. In addition, as shown in FIG. 9, a plurality of sub-through holes h may be formed through both of the first and second non-overlap areas NOA1 and NOA2.

Accordingly, even if a connection failure occurs in one sub-through hole, other sub-through holes can compensate for the connection failure. Accordingly, the reliability of the touch window can be improved.

Although FIGS. 8 and 9 show one integral-type connection electrode, the embodiment is not limited thereto, but at least two connection electrodes may be formed separately from each other as shown in FIG. 6.

Hereinafter, a touch window according to the second embodiment will be described with reference to FIGS. 10 to 14. In the following description of the touch window according to the second embodiment, the description the same as or similar to the above description of the first embodiment will be omitted, and the same elements will be assigned with the same reference numerals.

Figure 10:
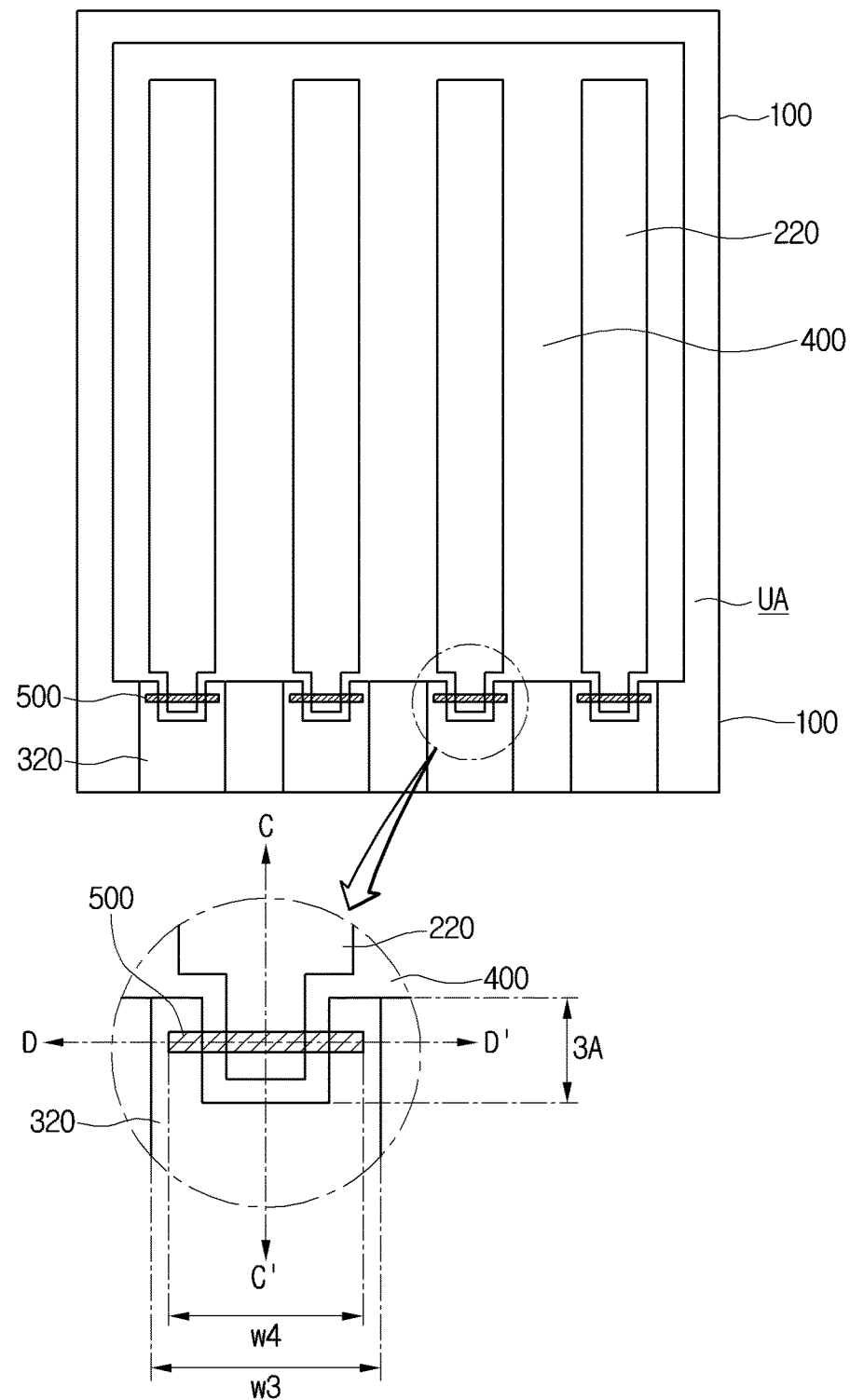
FIG. 10 is a plan view showing a touch window according to a second embodiment.
Figure 11:
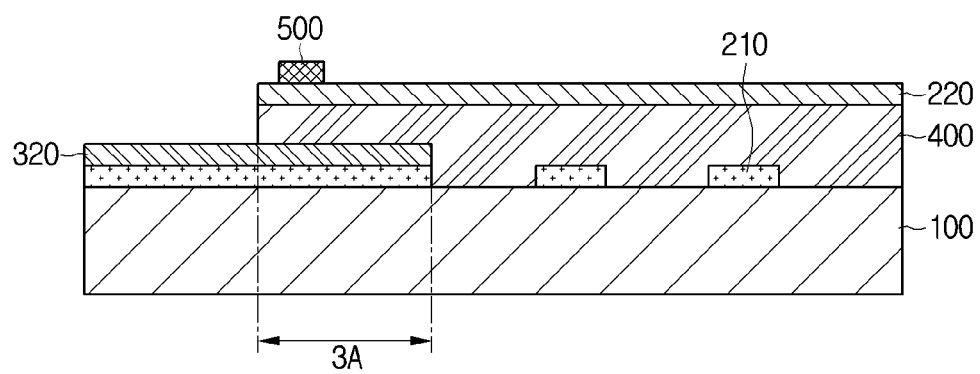
FIG. 11 is a sectional view taken along line C-C' of FIG. 10.
Figure 12:
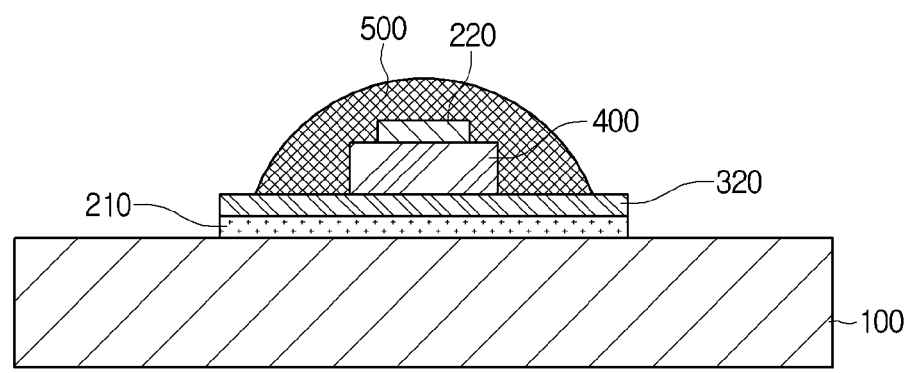
FIG. 12 is a sectional view taken along line D-D' of FIG. 10.

Referring to FIGS. 10 to 12, the second wire electrode 320 of the touch window according to the second embodiment includes a third area 3A sandwiched between the substrate 100 and the intermediate layer 400. In addition, the second sensing electrode 220 and the second wire electrode 320 may be connected with the third area 3A through the connection electrode 500.

The second wire electrode 320 may be partially covered with the intermediate layer 400 in the third area 3A. In other words, a portion of the second wire electrode 320, which is covered with the intermediate layer 400, and a portion of the second wire electrode 320, which is not covered with the intermediate layer 400, may be provided together in the third area 3A. For example, an edge of the second wire electrode 320 may not be covered with the intermediate layer 400 in the third area 3A.

The connection electrode 500 is not provided on the intermediate layer 400 in the third area 3A, but may be provided at an area in which the second wire electrode 320 is exposed. In other words, the connection electrode 500 may make contact with the second sensing electrode and the second wire electrode on the third area while connecting the second sensing electrode with the second wire electrode.

The width of the connection electrode 500 may be different from that of the second wire electrode 320. In detail, a width W4 of the connection electrode 500 may be narrower than a width W3 of the second wire electrode. Accordingly, the contact area between the connection electrode and the wire electrode can be minimized, so that the area of the unactive area UA can be reduced.

Figure 13:
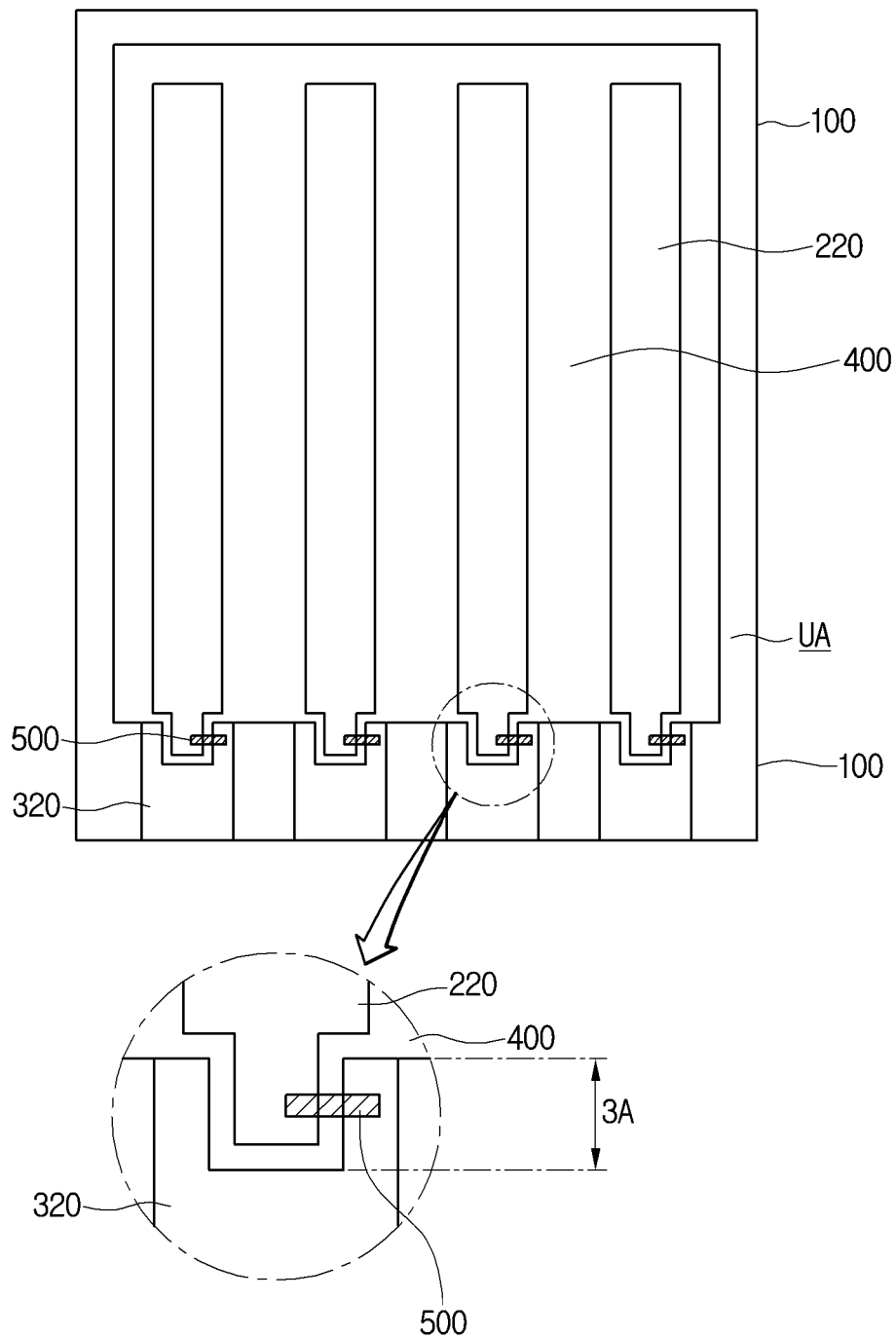
FIGS. 13 and 14 are plan views showing a touch window according to another example of the second embodiment.

Referring to FIG. 10, the intermediate layer 400 and the second sensing electrode 220 may have shapes complementary to that of the second wire electrode 320 in the third area 3A. In addition, the second sensing electrode 220 may cross the connection electrode 500 in the third area 3A. For example, the second sensing electrode 220 and the connection electrode 500 may be provided in the shape of a cross (+) in the third area 3A. Although FIG. 10 shows that both terminals of the connection electrode 500 are connected with the wire electrode, the embodiment is not limited thereto, but only one terminal of the connection electrode may be connected with the wire electrode as shown in FIG. 13.

Figure 14:
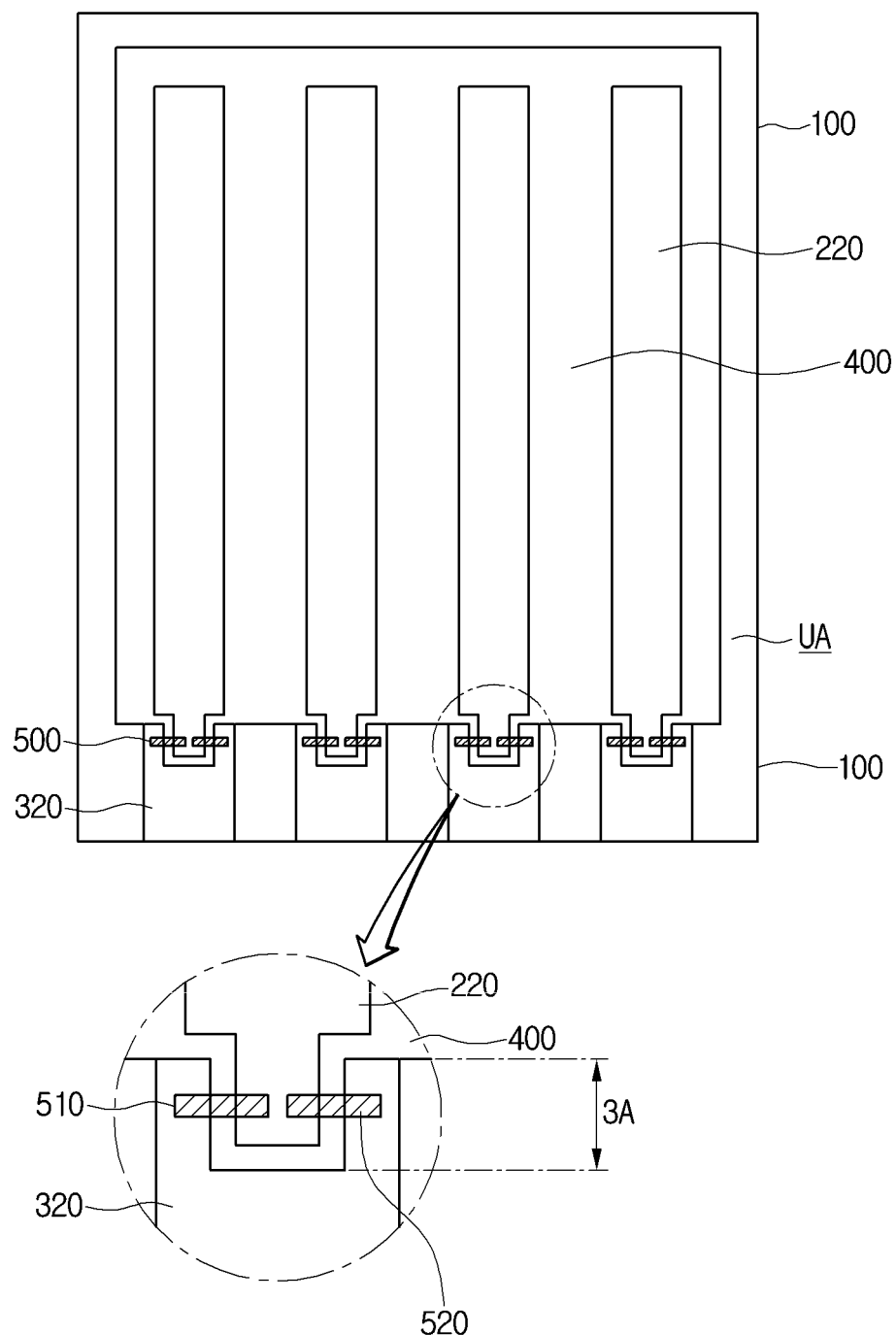
Figure 15:
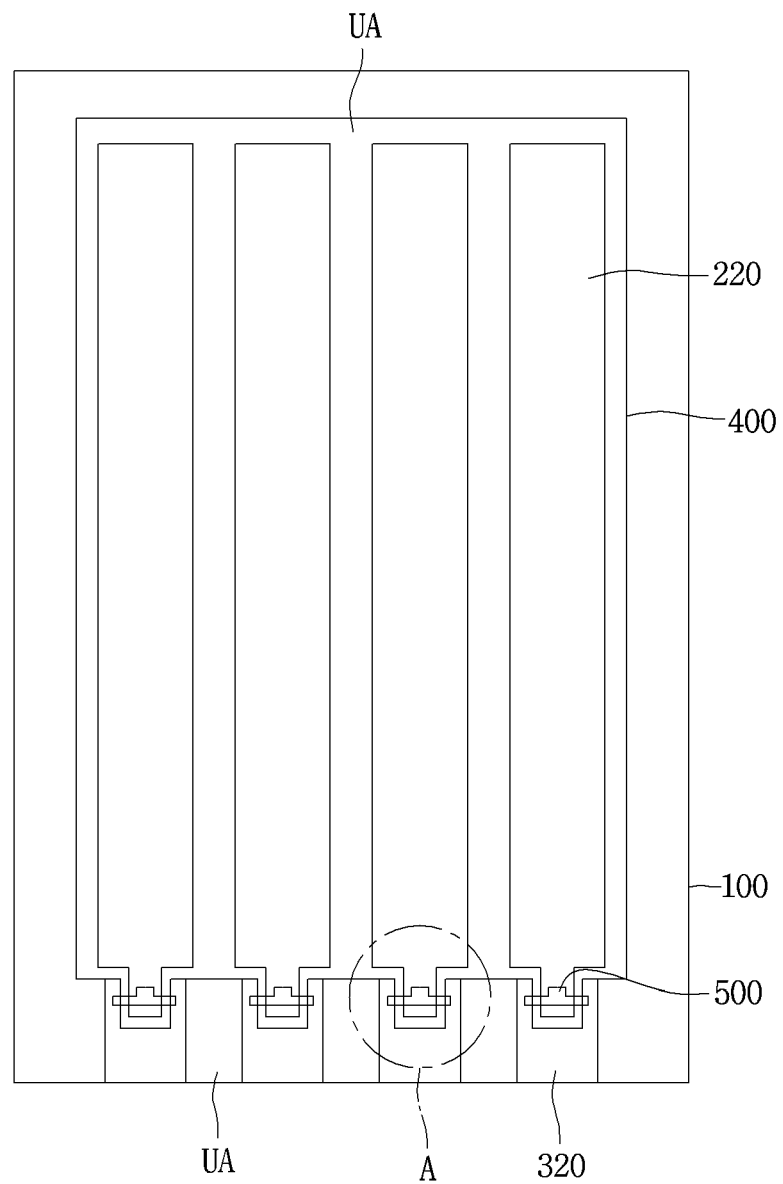
FIG. 15 is a plan view showing a touch window according to a third embodiment.

In addition, referring to FIG. 14, the connection electrode 500 may include a first connection electrode 510 and a second connection electrode 520, and one terminal of the first connection electrode 510 and one terminal of the second connection electrode 520 may be connected with the wire electrode.

According to the touch windows of the first and second embodiments, the active area, that is, the display area can be increased, and the reliability of the touch windows can be improved.

In detail, the sensing electrode provided on the intermediate layer is connected with the wire electrode provided on the substrate by the connection electrode on the intermediate layer, so that the area of the connection electrode can be more reduced as compared with the case of the connection on both of the intermediate layer and the substrate.

In other words, when the sensing electrode provided on the intermediate layer is connected with the wire electrode provided on the substrate by the connection electrode on both of the intermediate layer and the substrate, the bonding width of the connection electrode is increased, so that the display area may be reduced. According to the touch window of the embodiment, since the connection electrode is provided only on the intermediate layer, the bonding width of the connection electrode can be reduced. Accordingly, the display area can be prevented from being reduced due to the connection electrode.

In addition, when the sensing electrode provided on the intermediate layer is connected with the wire electrode provided on the substrate by the connection electrode on both of the intermediate layer and the substrate, the connection electrode may be shorted or damaged due to the step difference between the intermediate layer and the substrate. However, according to the touch window of the embodiment, since the sensing electrode is connected with the wire electrode by the connection electrode only on the intermediate layer without the step difference, the connection electrode can be prevented from being shorted or damaged. Accordingly, the reliability of the touch window can be improved.

Hereinafter, a touch window according to the third embodiment will be described with reference to FIGS. 15 to 22. In the following description of the touch window according to the second embodiment, the description the same as or similar to the above description of the first and second embodiments will be omitted, and the same elements will be assigned with the same reference numerals.

Referring to FIGS. 15 to 22, the touch window according to the embodiment may include the substrate 100, the sensing electrode 200, the wire electrode 300, the intermediate layer 400, and the connection electrode 500.

The wire electrode 300 may have a width different from that of the sensing electrode 200. For example, a width W1 of the sensing electrode 200 may be wider than a width W2 of the wire electrode 300. Accordingly, the sensing electrode can be easily connected with the wire electrode.

The sensing electrode and the wire electrode may be connected with each other on the intermediate layer 400. For example, the second sensing electrode 220, which is provided on the intermediate layer 400, may be connected with the second wire electrode 320, which is provided on the substrate 100, on the intermediate layer 400.

One terminal of the intermediate layer 400 may protrude. For example, referring to FIGS. 15 to 20, one terminal of the intermediate layer 400 overlapped with the second wire electrode 320 may protrude. In other words, the intermediate layer 400 may include a protrusion part. The intermediate layer 400 may support the second sensing electrode 220. In detail, the second sensing electrode 220 may be provided on at least one of both surfaces of the intermediate layer 400.

The second sensing electrode 220 may be provided on the intermediate layer 400 while forming a width different from that of the intermediate layer 400. In detail, a width of the second sensing electrode 220 provided on the protrusion part of the intermediate layer 400 may be narrower than that of the second sensing electrode 220 provided at the remaining area of the intermediate layer 400.

The second sensing electrode 220 provided on the intermediate layer 400 may be connected with the second wire electrode 320 provided on the substrate 100. In detail, the second sensing electrode 220 and the second wire electrode 320 may be connected with each other at the protrusion part of the intermediate layer 400.

The second sensing electrode 220 may be connected with the second wire electrode 320 by the connection electrode

500. In detail, one area of the connection electrode 500 may directly or indirectly make contact with the second sensing electrode 220, and another area of the connection electrode 500 may directly or indirectly make contact with the second wire electrode 320.

The connection electrode 500 may include a conductive material. For example, the connection electrode 500 may include a metallic material. In addition, the connection electrode 500 may include metallic paste. For example, the connection electrode 500 may include silver (Ag) paste.

Referring to FIGS. 15 to 20, the connection electrode 500 may extend in at least two directions. For example, the connection electrode 500 may include the first pattern 510 and the second pattern 520. In detail, the connection electrode 500 may include the first pattern 510 extending in a first direction and the second pattern 520 extending in a second direction different form the first direction.

The first and second patterns 510 and 520 may be simultaneously formed through one printing process. The first pattern 510 may extend in a direction different from that of at least one of the second sensing electrode 220 and the second wire electrode 320. For example, the first pattern 510 may extend in a direction perpendicular to the extension direction of at least one of the second sensing electrode 220 and the second wire electrode 320.

The first pattern 510 may make contact with at least one of the second sensing electrode 220 and the second wire electrode 320. In detail, the first pattern 510 may make contact with the second sensing electrode 220 and the second wire electrode 320. For example, the first pattern 510 may make contact with the second sensing electrode 220 on the intermediate layer 400, and may directly or indirectly make contact with the second wire electrode 320 beyond the intermediate layer 400.

The second pattern 520 may extend in a direction the substantially same as or similar to, that is, corresponding to that of at least one of the second sensing electrode 220 and the second wire electrode 320. For example, the second pattern 520 may extend in a direction the substantially same as or similar to the extension direction of at least one of the second sensing electrode 220 and the second wire electrode 320. In this case, the substantially same as or similar direction not only refers to the completely same direction, but also refers to a direction having a tolerance or an error. The second pattern 520 may make contact with at least one of the second sensing electrode 220 and the second wire electrode 320.

Figure 16:
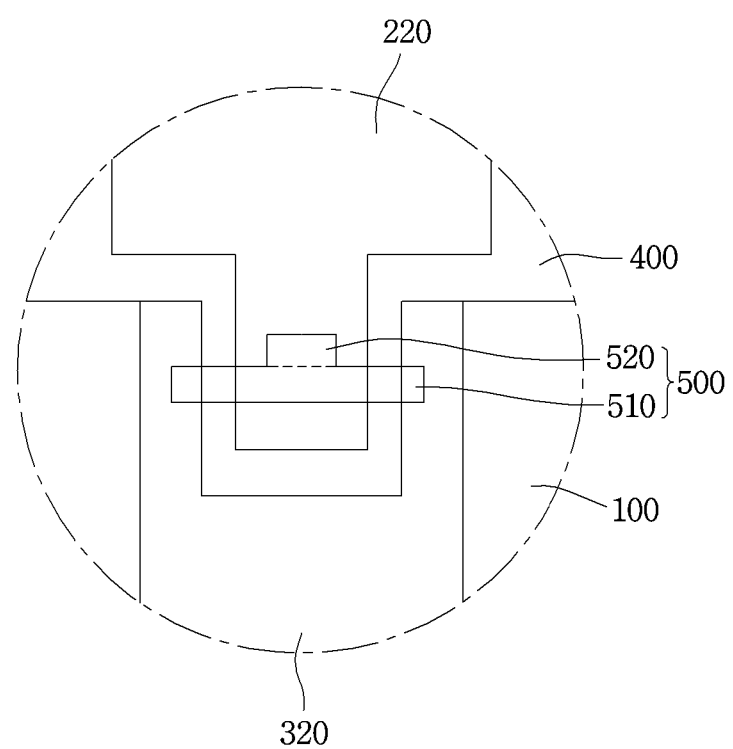
FIGS. 16 to 20 are an enlarged view showing a region A of FIG. 15.
Figure 17:
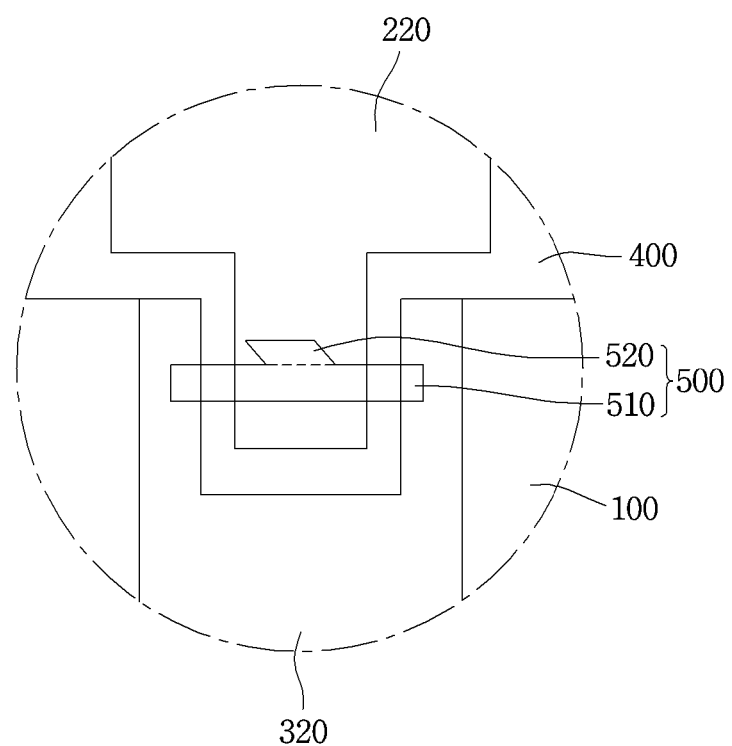

Referring to FIG. 16, the second pattern 520 may directly or indirectly make contact with the second sensing electrode 220. In other words, the second pattern 520 may directly or indirectly make contact with the second sensing electrode 220 and the first pattern 510. The second patter 520 may protrude from the first pattern 510. In detail, the second pattern 520 may protrude from the first pattern 510 in the direction of the second sensing electrode 220.

The first pattern 510 may make contact with the second sensing electrode 220 and the second wire electrode 320. In addition, the second pattern 520 may make contact with the second sensing electrode 220 on the intermediate layer 400. In other words, the connection electrode 500 may connect the second sensing electrode 220 with the second wire electrode 320 by the first and second patterns 510 and 520.

The adhesive strength of the connection electrode 500 to connect the second sensing electrode 220 with the second wire electrode 320 can be improved by the second pattern 520. In other words, the adhesive strength between the connection electrode 500 and the second sensing electrode 220, and between the connection electrode 500 and the second wire electrode 320 can be improved by the second pattern 520.

Although FIG. 16 shows that the second pattern 520 is provided on the intermediate layer 400, the embodiment is not limited thereto, but the second pattern 520 may be provided at both of an upper portion of the intermediate layer 400 and an outside of the intermediate layer 500, that is, the second wire electrode 320. In other words, the connection electrode 500 may include at least one second pattern 520.

The second pattern 520 may protrude while extending in a direction perpendicular to the first pattern 510. In this case, the perpendicular direction not only refers to a perfectly vertical direction, but also refers to a direction to which the tolerance or the error occurring during the process is applied.

However, the embodiment is not limited thereto, but the second pattern 520 may be inclined with respect to the first pattern 510. In other words, as shown in FIG. 4, the second pattern 520 may be inclined at a predetermined angle with respect to the first pattern 510 while protruding from the first pattern 510.

Figure 18:
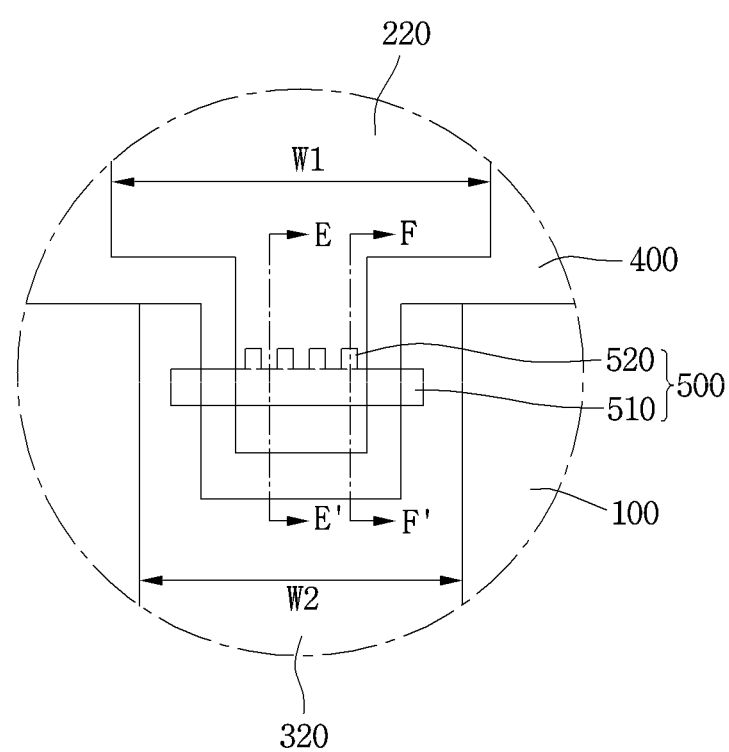
Figure 19:
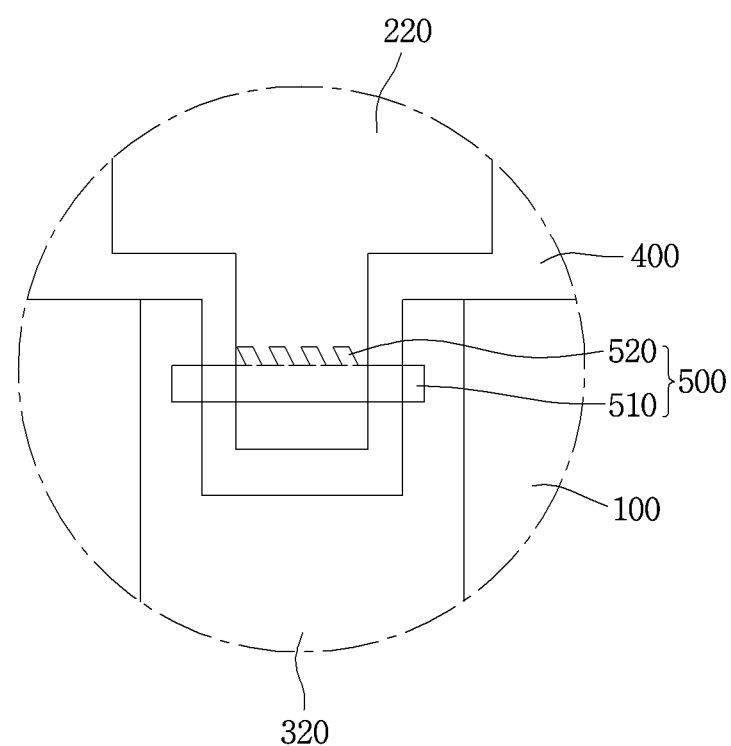

Referring to FIGS. 18 and 19, the connection electrode 500 may include a plurality of second patterns 520 spaced apart from each other. Referring to FIG. 18, the connection electrode 500 may include the first pattern 510 and the second patterns 520 protruding from the first pattern 510 while being spaced apart from each other. Accordingly, even if the electrical short may occur in one pattern, another pattern can compensate for the electrical short. Accordingly, the reliability of the touch window can be improved.

The first pattern 510 may make contact with the second sensing electrode 220 and the second wire electrode 320. In addition, the second patterns 520 may make contact with the second sensing electrode 220 on the intermediate layer 400. In other words, the connection electrode 500 may connect the second sensing electrode 220 with the second wire electrode 320 by the first pattern 510 and the second patterns 520.

In addition, the adhesive strength of the connection electrode 500 to connect the second sensing electrode 220 with the second wire electrode 320 can be improved by the second patterns 520. The adhesive strength between the connection electrode 500 and the second sensing electrode 220 and between the connection electrode 500 and the second wire electrode 320 may be improved by the second pattern 520.

The second patterns 520 may protrude from the first pattern 510 in a direction perpendicular to the first pattern 510. In this case, the perpendicular direction not only refers to a perfectly vertical direction, but also refers to a direction to which the tolerance or the error occurring during the process is applied.

However, the embodiment is not limited thereto, but the second patterns 520 may be inclined with respect to the first pattern 510. In other words, as shown in FIG. 6, the second pattern 520 may be inclined at a predetermined angle with respect to the first pattern 510 while protruding from the first pattern 510.

Figure 21:
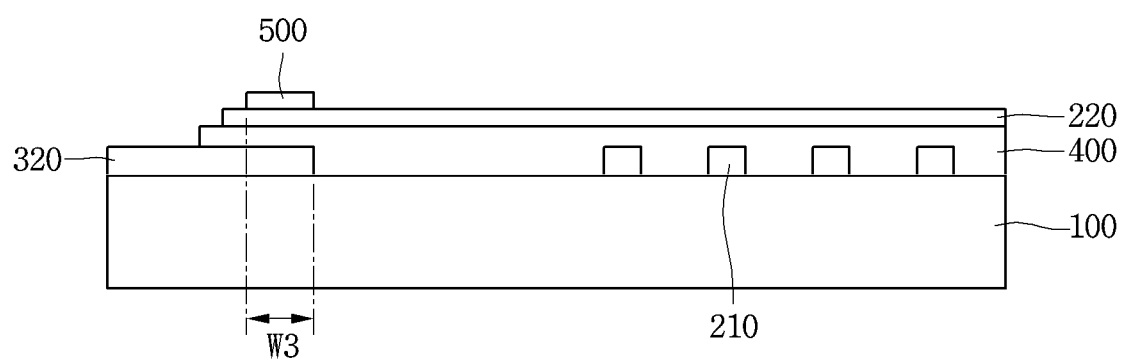
FIG. 21 is a sectional view taken along line E-E' of FIG. 18.
Figure 22:
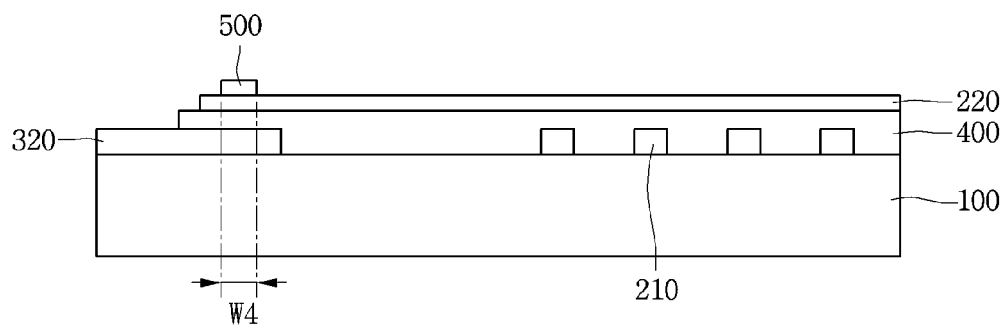
FIG. 22 is a sectional view taken along line F-F' of FIG. 18.

FIGS. 21 and 22 are sectional views taken along lines E-E' and F-F' of FIG. 18. In detail, FIG. 21 is a sectional view showing an area between the second patterns in the connection electrode, that is, an area where the second pattern 520 is not provided, and FIG. 22 is a sectional view showing an area where the second pattern 520 is provided in the connection electrode.

Referring to FIGS. 21 and 22, the contact area between the connection electrode 500 and the second sensing electrode 220 in the area where the second pattern 520 is provided may be wider than the contact area between the connection electrode 500 and the second sensing electrode 220 in the area where the second pattern 520 is not provided.

In detail, a width W3 of the connection electrode 500 making contact with the second sensing electrode 220 in the area where the second pattern 520 is provided may be wider than a width W4 of the connection electrode 500 making contact with the second sensing electrode 220 in the area where the second pattern 520 is not provided.

Although the first pattern 510 and the second pattern 520 have been separately described and shown in FIGS. 16 and 19 for the convenience of explanation, the embodiment is not limited thereto, but the first pattern 510 may be formed integrally with the second pattern 520.

In addition, the first pattern 510 and the second pattern 520 may include the same material or a similar material. For example, the first and second patterns 510 and 5120 may include silver (Ag) paste.

In addition, although FIGS. 16 and 19 show that the first and second patterns 510 and 520 extending only in the first and second directions mutually different from each other, the embodiment is not limited thereto, but a plurality of patterns, which extend in third and fourth directions different from the first and second directions, may be further provided.

According to the touch window of the embodiment, the connection electrode to connect the sensing electrode on the intermediate layer with the wire electrode on the substrate may extend in at least two directions. In other words, the connection electrode may include the first pattern extending in the first direction and the second pattern extending in the second direction different from the first direction. Accordingly, the contact area between the connection electrode and the sensing electrode, and between the connection electrode and the wire electrode may be increased.

Accordingly, as the contact areas between the connection electrode and the sensing electrode, and between the connection electrode and the wire electrode are increased, the adhesive strength of the connection electrode can be improved, so that the connection electrode can be prevented from being delaminated from the sensing electrode or the wire electrode.

In addition, as the connection electrode extends in at least two directions, when a flexible touch window, that is, a curved touch window is realized by bending the touch window in one direction, even if connection electrodes extending in one direction or an opposite direction are cracked, a connection electrode extending in a direction the same as or similar to the one direction compensates for the crack. Accordingly, the failure of the touch window can be prevented.

According to the touch window of the embodiment, as the connection electrode is printed and provided in at least two directions, the failure of the touch window can be prevented, so that the reliability of the touch window can be improved.

Figure 20:
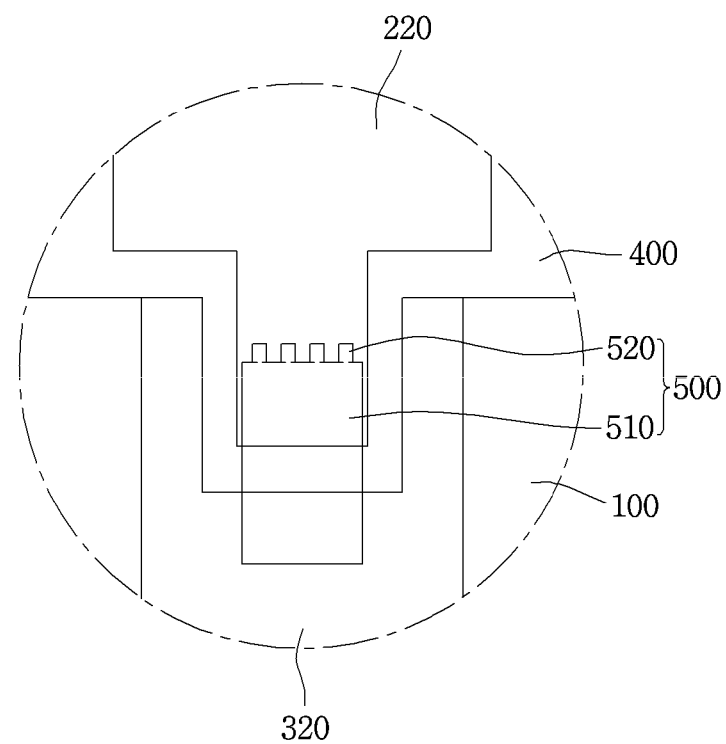

FIG. 20 is an enlarged sectional view showing another example of the touch window according to the third embodiment. Referring to FIG. 20, the connection electrode of the touch window according to another example of the third embodiment may extend in a direction different from that of the previous embodiment. The first pattern may extend in the direction the same as the extension direction of the second sensing electrode or the second wire electrode. In addition, one terminal of the first pattern 510 may be connected with the second sensing electrode 220, and an opposite terminal of the second pattern 520 may be connected with the second wire electrode 320.

The second pattern 520 may protrude from the first pattern 510. In addition, the second pattern 520 may be connected with the second sensing electrode 220 on the intermediate layer 400.

Figure 23:
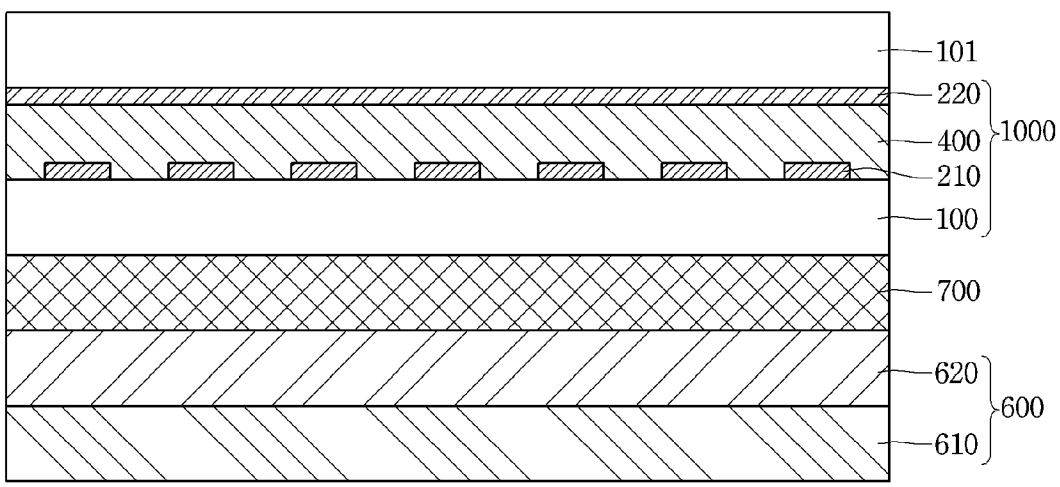
FIGS. 23 and 24 are sectional views showing a touch device obtained by combining the touch window according to the embodiments with a display panel.
Figure 24:
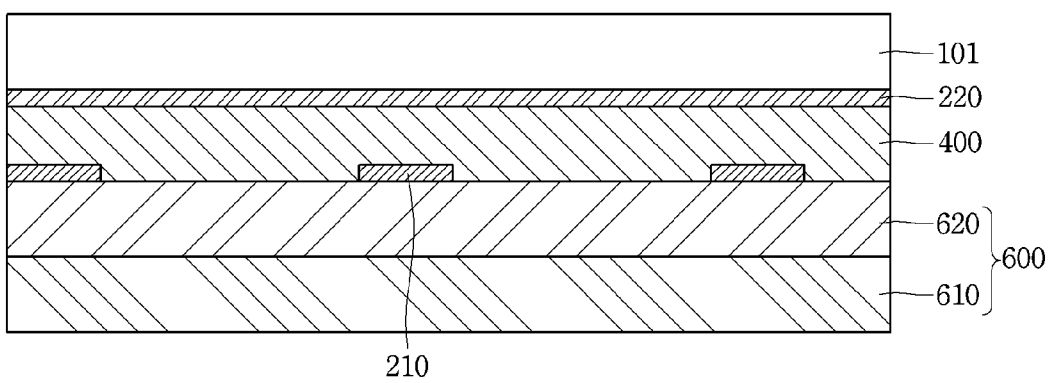

Hereinafter, a touch device including a display panel coupled to the above-described touch window according to the embodiments will be described with reference to FIGS. 23 and 24. Referring to FIGS. 23 and 24, the touch device according to the embodiment may include a touch panel provided on the display panel 600.

In detail, referring to FIG. 23, the touch device according to the embodiment may be formed by coupling a touch window 1000 described above and a display panel 600. The touch window 1000 may be bonded to the display panel 600 through an adhesive layer 700. For example, the touch window 1000 may be combined with the display panel 600 through the adhesive layer 700 including an optically clear adhesive (OCA) or an optically clear resin (OCR). A cover substrate 101 may be provided on one surface of the touch window 1000.

The display panel 600 may include a first substrate 610 and a second substrate 620. When the display panel 600 is a liquid crystal display panel, the display panel 600 may have a structure in which the first substrate 610 including a thin film transistor (TFT) and a pixel electrode is combined with the second substrate 620 including color filer layers while a liquid crystal layer is interposed between the first substrate 610 and the second substrate 620.

In addition, the display panel 600 may be a liquid crystal display panel having a COT (color filter on transistor) structure in which the second substrate 620 is combined with the first substrate 610 on which a thin film transistor, a color filter and a black matrix are formed while a liquid crystal layer is interposed between the first and second substrates 610 and 620. That is, the thin film transistor may be formed on the first substrate 610, the protective layer may be formed on the thin film transistor, and the color filter layer may be formed on the protective layer. In addition, the pixel electrode making contact with the thin film transistor is formed on the first substrate 610. In this case, in order to improve an aperture rate and simplify a mask process, the black matrix may be omitted and a common electrode may be formed to perform the function of the black matrix together with the inherent function thereof.

In addition, when the display panel 600 is a liquid crystal panel, the display device may further include a backlight unit for providing light at the back of the display panel 600.

When the display panel 600 is an organic light emitting device, the display panel 600 includes a self light-emitting device which does not require any additional light source. A thin film transistor is formed on the first substrate 610 of the display panel 600, and an organic light-emitting device (OLED) making contact with the thin film transistor is formed. The OLED may include an anode, a cathode and an organic light-emitting layer formed between the anode and the cathode. In addition, the display panel 600 may further include the second substrate 620, which performs the function of an encapsulation substrate for encapsulation, on the OLED.

Referring to FIG. 24, the touch device according to the embodiment may be formed integrally with the display panel 600. In other words, a substrate to support at least one sensing electrode may be omitted.

In detail, at least one sensing electrode may be provided on at least one surface of the display panel 600. In addition, at least one sensing electrode may be formed on at least one surface of the first substrate 610 or the second substrate 620. In this case, at least one sensing electrode may be formed on a top surface of an upper substrate.

Referring to FIG. 24, the first sensing electrode 210 may be provided on one surface of the intermediate layer 400. In addition, a first wire connected with the first sensing electrode 310 may be provided on the one surface of the intermediate layer 400. In addition, the second sensing electrode 220 may be provided on one surface of the display panel 600. In addition, a second wire connected with the second sensing electrode 220 may be provided on one surface of the display panel 600.

In addition, a polarizing plate may be further provided under the cover substrate 101. The polarizing plate may be a linear polarizing plate or an anti-reflection polarizing plate. For example, when the display panel 600 is a liquid crystal display panel, the polarizing plate may be a linear polarizing plate. In addition, when the display panel 600 is an organic electroluminescence display panel, the polarizing plate may be an anti-reflection polarizing plate. According to the touch device of the embodiment, at least one substrate to support the sensing electrode may be omitted. Accordingly, a thin and light touch device can be formed.

Figure 25:
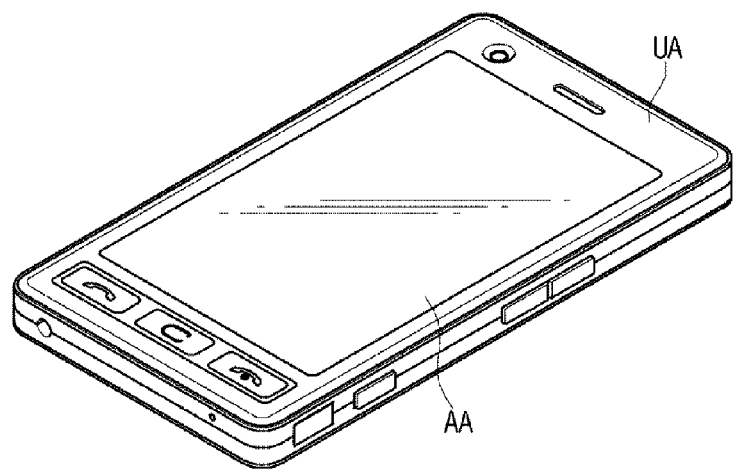
FIGS. 25 to 28 are views showing examples of a display device employing the touch window according to the embodiments.

Hereinafter, one example of a display employing the above-described touch window according to the embodiments will be described with reference to FIGS. 25 to 28. Referring to FIG. 25, a mobile terminal is shown as one example of the touch device. The mobile terminal may include an active area AA and an unactive area UA. The active area AA may sense a touch signal by the touch of a finger, and the unactive area UA may include a command icon pattern part and a logo.

Figure 26:
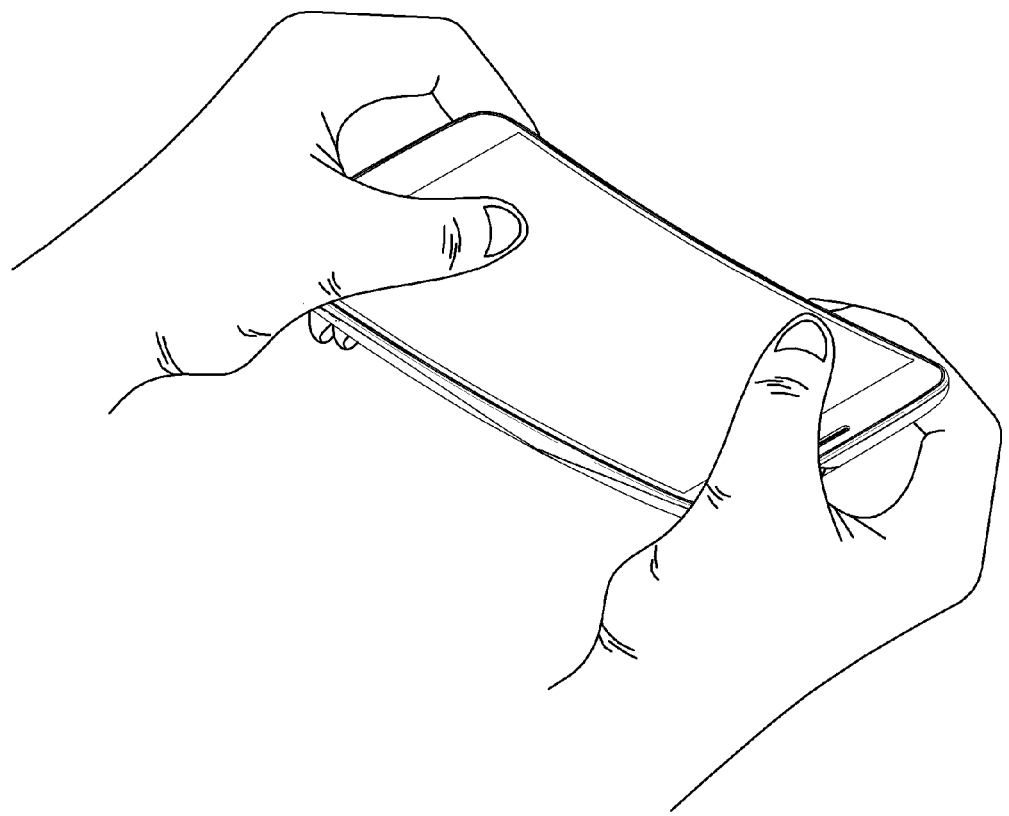

Referring to FIG. 26, the touch window may include a flexible touch window that may be bendable. Therefore, the touch device including the flexible touch window may be a flexible touch device. Accordingly, a user can curve or bend the flexible touch device with a hand. The flexible touch window may be applied to a wearable touch device.

Figure 27:
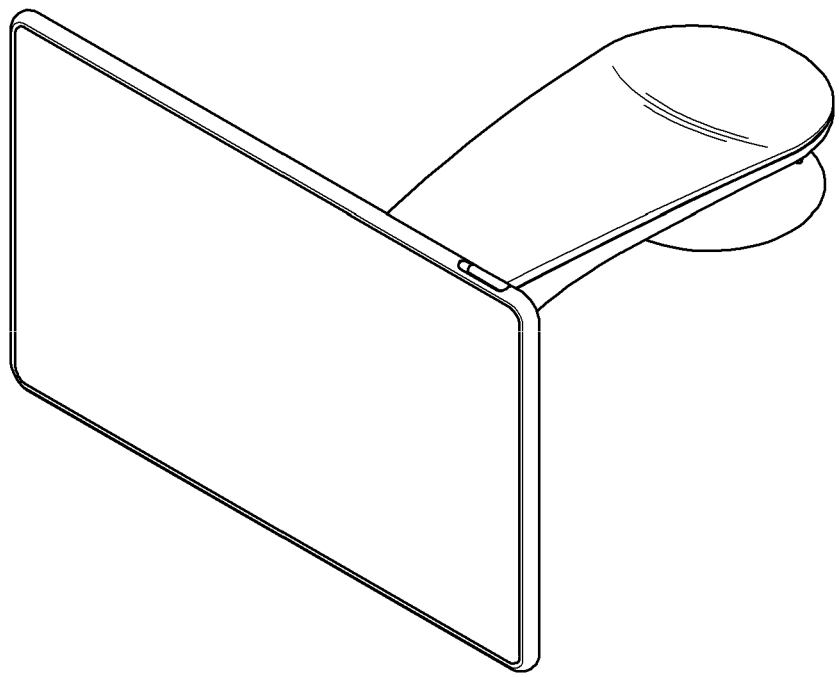

Referring to FIG. 27, the touch window may be applied to a vehicle navigation as well as a touch device of a mobile terminal.

Figure 28:

In addition, referring to FIG. 28, the touch window may be applied to internal parts of the vehicle. In other words, the touch window may be applied to various parts allowing the touch window. Accordingly, the touch window may be applied to not only a PND (Personal Navigation Display), but also a dashboard, so that a CID (Center Information Display) may be implemented. However, the embodiment is not limited to the above, but the touch device can be used for various electronic appliances.

The embodiment provides a touch window capable of expanding a display area and improving reliability.

There is provided a touch window including a substrate comprising an active area and an unactive area, a wire electrode on the unactive area, an intermediate layer provided on the substrate to cover an end of the wire electrode, a sensing electrode on the intermediate layer, and a connection electrode to connect the sensing electrode with the wire electrode. The connection electrode is provided on the intermediate layer to connect the sensing electrode with the wire electrode.

According to the touch window of the embodiment, the active area, that is, the display area can be increased, and the reliability of the touch window can be improved.

According to the touch window of the embodiment, since the connection electrode is provided only on the intermediate layer, the bonding width of the connection electrode can be reduced, so that the display area can be prevented from being reduced due to the connection electrode.

According to the touch window of the embodiment, since the sensing electrode is connected with the wire electrode by the connection electrode only on the intermediate layer without the step difference, the problems caused by the connection electrode can be solved. Accordingly, the reliability of the touch window can be improved.

According to the touch window of the embodiment, the connection electrode to connect the sensing electrode provided on the intermediate layer with the wire electrode provided on the substrate can extend in two directions.

As the contact areas between the connection electrode and the sensing electrode, and between the connection electrode and the wire electrode are increased, the adhesive strength of the connection electrode can be improved, so that the connection electrode can be prevented from being delaminated from the sensing electrode or the wire electrode.

As the connection electrode extends in at least two directions, when a flexible touch window, that is, a curved touch window is realized by bending the touch window in one direction, even if connection electrodes extending in one direction or an opposite direction are cracked, a connection electrode extending in a direction the same as or similar to the one direction compensates for the crack. Accordingly, the failure of the touch window can be prevented.

According to the touch window of the embodiment, as the connection electrode is printed and provided in at least two directions, the failure of the touch window can be prevented, so that the reliability of the touch window can be improved.

In the description of the above embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern. Such a position of the layer has been described with reference to the drawings.

In addition, when a predetermined part "is connected to" another part, this refers to not only that the predetermined part is directly connected to another part, but also that the predetermined part is indirectly connected to another part while interposing another component between the predetermined part and another part. In addition, when a predetermined part "includes" a predetermined component, the predetermined part does not exclude other components, but may further include other components unless indicated otherwise.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch window comprising:
   a wire electrode on a substrate;
   the substrate;
   an intermediate layer provided on the substrate to cover an end of the wire electrode;
   sensing electrodes including a first sensing electrode and a second sensing electrode provided to the intermediate layer; and
   a connection electrode to connect the second sensing electrode with the wire electrode, wherein the first sensing electrode is provided on the substrate, wherein the second sensing electrode is provided on the intermediate layer and extends in a different direction than the first sensing electrode, wherein the connection electrode is provided on the intermediate layer to connect the second sensing electrode with the wire electrode, wherein the intermediate layer covers at least one part of the first sensing electrode,
   wherein the intermediate layer is provided between the second sensing electrode and the wire electrode
   wherein the intermediate layer is made up of a transparent oxide or In (Indium) compound, wherein the wire electrode includes:
   a first area sandwiched between the substrate and the intermediate layer; and
   a second area having a step difference from the intermediate layer, wherein the sensing electrode and the wire electrode are connected with each other on the first area,
   wherein at least one through hole is formed in the first area, and wherein the connection electrode extends in a different direction than the second sensing electrode while making contact with the first area exposed through the through hole and the second sensing electrode.

2. The touch window of claim 1, wherein the hole exposes the wire electrode.

3. The touch window of claim 1, wherein the first area includes an overlap area and a non-overlap area based on an overlap state with the sensing electrode, and wherein the at least one through hole is formed in the non-overlap area.

4. The touch window of claim 3, wherein the non-overlap area includes a first non-overlap area and a second non-overlap area spaced apart from each other, and the at least one through hole comprises a first through hole formed in the first non-overlap area and a second through hole formed in the second non-overlap area.

5. The touch window of claim 4, wherein the connection electrode contacts at least one of first areas exposed through the first and second through holes and the sensing electrode.

6. The touch window of claim 4, wherein the connection electrode comprises:
   a first connection electrode making contact with the first area exposed through the first through hole and the sensing electrode; and
   a second connection electrode making contact with the first area exposed through the second through hole and the sensing electrode.

7. The touch window of claim 3, wherein the non-overlap area comprises a first non-overlap area and a second non-overlap area spaced apart from each other, and the at least one through hole is formed on at least one of the first and second non-overlap areas.

8. The touch window of claim 7, wherein the at least one through hole is formed on the at least one of the first and second non-overlap areas and includes a plurality of sub-through holes spaced apart from each other.

9. The touch window of claim 1, wherein the wire electrode includes a third area sandwiched between the substrate and the intermediate layer, and the sensing electrode and the wire electrode are connected with each other on the third area.

10. The touch window of claim 9, wherein at least one of the sensing electrode and the intermediate layer in the third area has a shape complementary to a shape of the wire electrode.

11. The touch window or claim 9, wherein the sensing electrode crosses the connection electrode in the third area.

12. A touch window comprising:
    a cover substrate including a first area and a second area;
    an intermediate layer on the first area;
    a wire electrode on the second area;
    sensing electrodes including a first sensing electrode and a second sensing electrode provided to the intermediate layer; and
    a connection electrode making contact with the sensing electrode and the wire electrode, wherein the first sensing electrode is provided on the substrate, wherein the second sensing electrode is provided on the intermediate layer and extends in a different direction than the first sensing electrode, wherein the connection electrode extends in at least two directions, wherein the intermediate layer covers at least one part of the first sensing electrode,
    wherein the intermediate layer is provided between the second sensing electrode and the wire electrode,
    wherein the intermediate layer is made up of a transparent oxide or In (Indium) compound,
    wherein the wire electrode includes:
    a first area sandwiched between the substrate and the intermediate layer; and
    a second area having a step difference from the intermediate layer, wherein the second sensing electrode and the wire electrode are connected with each other on the first area of the wire electrode,
    wherein at least one through hole is formed in the first area of the wire electrode, and
    wherein the connection electrode extends in a different direction than the second sensing electrode while making contact with the first area of the wire electrode exposed through the through hole and the second sensing electrode.

13. The touch window of claim 12, wherein the connection electrode includes:
    a first pattern extending in a first direction; and
    a second pattern extending in a direction different from the first direction.

14. The touch window of claim 13, wherein the first pattern contacts the sensing electrode and the wire electrode, and the second pattern makes contact with at least one of the sensing electrode and the wire electrode.

15. The touch window of claim 13, wherein the second pattern extends in a direction corresponding to a direction that the sensing electrode or the wire electrode extends.

16. The touch window of claim 15, wherein the second pattern extends in a direction perpendicular to the first pattern.

17. The touch window of claim 13, wherein the connection electrode includes at least one second pattern.

* * * * *